US011740657B2

(12) United States Patent
Spyrison et al.

(10) Patent No.: US 11,740,657 B2
(45) Date of Patent: Aug. 29, 2023

(54) DISPLAY AND DOCKING APPARATUS FOR A PORTABLE ELECTRONIC DEVICE

(71) Applicant: TARGUS INTERNATIONAL LLC, Anaheim, CA (US)

(72) Inventors: Benjamin Nolan Spyrison, Los Angeles, CA (US); Alex Robert Cabunoc, Long Beach, CA (US); Jonny Yuan, Placentia, CA (US); Mark Jonathan Twitchett, Buckinghamshire (GB)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 393 days.

(21) Appl. No.: 16/721,403

(22) Filed: Dec. 19, 2019

(65) Prior Publication Data

US 2020/0201388 A1   Jun. 25, 2020

Related U.S. Application Data

(60) Provisional application No. 62/782,224, filed on Dec. 19, 2018.

(51) Int. Cl.
*G06F 1/16* (2006.01)

(52) U.S. Cl.
CPC .......... *G06F 1/1632* (2013.01); *G06F 1/1681* (2013.01); *G06F 1/1683* (2013.01); *G06F 1/1622* (2013.01); *G06F 1/1626* (2013.01)

(58) Field of Classification Search
CPC .... G06F 1/1632; G06F 1/1628; G06F 1/1681; G06F 1/1683; G06F 1/1622; F16M 11/14; F16M 11/121
See application file for complete search history.

(56) References Cited

U.S. PATENT DOCUMENTS

| 5,539,616 A | 7/1996 | Kikinis |
| 5,627,974 A | 5/1997 | Watts, Jr. et al. |

(Continued)

FOREIGN PATENT DOCUMENTS

| AU | 2014100171 A4 | 3/2014 |
| CN | 101893916 A | 11/2010 |

(Continued)

OTHER PUBLICATIONS

PCT/US2020/047448, et al., International Search Report and Written Opinion, dated Nov. 20, 2020, 13 pages.

(Continued)

*Primary Examiner* — Nidhi Thaker
(74) *Attorney, Agent, or Firm* — Stoel Rives LLP

(57) ABSTRACT

Display and docking apparatuses for portable electronic devices are disclosed. A display apparatus includes a portable electronic device assembly and a docking stand assembly. A portable electronic device assembly includes a portable electronic device (PED) and a case. A docking stand assembly includes a docking tray to removably attach to the PED assembly, a base, a hinge connecting the docking tray and the base and to allow the docking tray to pivot relative to the base, and a cable attached to a first interface and a second interface. The cable is to travel through at least a portion of the docking stand assembly with the first interface located at the base of the docking stand assembly and the second interface available at (or integrated into) the docking tray. The base may be divided into one or more removeable modules, each module providing additional functionality to the display apparatus.

33 Claims, 19 Drawing Sheets

(56) References Cited

U.S. PATENT DOCUMENTS

| | | | |
|---|---|---|---|
| 5,692,400 A | 12/1997 | Bliven et al. | |
| 5,751,548 A * | 5/1998 | Hall | F16M 11/2064 |
| | | | 361/679.41 |
| 5,835,733 A | 11/1998 | Walsh et al. | |
| 5,864,708 A | 1/1999 | Croft et al. | |
| 5,873,151 A | 2/1999 | Sood | |
| 5,886,424 A | 3/1999 | Kim | |
| 6,029,215 A | 2/2000 | Watts, Jr. et al. | |
| 6,170,026 B1 | 1/2001 | Kimura et al. | |
| 6,275,378 B1 | 8/2001 | Lee et al. | |
| 6,556,435 B1 * | 4/2003 | Helot | G06F 1/1632 |
| | | | 361/679.09 |
| 6,604,199 B1 | 8/2003 | Yang et al. | |
| 6,629,182 B1 | 9/2003 | Mizoguchi et al. | |
| 6,665,805 B1 | 12/2003 | Tsirkel et al. | |
| 6,804,740 B1 | 10/2004 | Watts, Jr. | |
| 6,888,338 B1 | 5/2005 | Popescu-Stanesti et al. | |
| 6,956,474 B2 | 10/2005 | Jakubowski | |
| 6,976,885 B2 | 12/2005 | Lord | |
| 7,035,100 B2 | 4/2006 | Charles | |
| 7,035,126 B1 | 4/2006 | Lanni | |
| 7,062,389 B2 | 6/2006 | Johnson et al. | |
| 7,099,152 B2 | 8/2006 | Gasbarro | |
| 7,103,760 B1 | 9/2006 | Billington et al. | |
| 7,171,461 B2 | 1/2007 | Ewing et al. | |
| 7,201,611 B2 | 4/2007 | Faranda | |
| 7,225,227 B2 | 5/2007 | Omura et al. | |
| 7,227,747 B2 * | 6/2007 | Walker | E05B 73/0082 |
| | | | 361/679.41 |
| 7,281,698 B2 | 10/2007 | Patterson, Jr. | |
| 7,403,232 B1 | 7/2008 | Orlicki et al. | |
| 7,471,511 B2 | 12/2008 | Montag et al. | |
| 7,643,283 B2 | 1/2010 | Jubelirer et al. | |
| 7,681,134 B1 | 3/2010 | Grechishkin et al. | |
| 7,683,573 B2 | 3/2010 | Nikazm et al. | |
| 7,818,480 B2 | 10/2010 | Hoerl et al. | |
| 7,899,970 B2 | 3/2011 | Mori | |
| 7,926,430 B2 | 4/2011 | Bakker | |
| 7,976,337 B1 | 7/2011 | Cortopassi et al. | |
| 8,074,581 B2 | 12/2011 | Epstein et al. | |
| 8,312,199 B2 | 11/2012 | Johnson | |
| 8,323,040 B2 | 12/2012 | Prest | |
| 8,346,753 B2 | 1/2013 | Hayes | |
| 8,358,943 B2 | 1/2013 | Kim | |
| 8,359,356 B2 | 1/2013 | Belz et al. | |
| 8,395,605 B2 | 3/2013 | Sisto et al. | |
| 8,508,573 B2 | 8/2013 | Grimshaw | |
| 8,510,424 B2 | 8/2013 | Ewing et al. | |
| 8,611,076 B2 | 12/2013 | Wetzel et al. | |
| 8,751,836 B1 | 6/2014 | Piszczek et al. | |
| 8,762,752 B2 | 6/2014 | Inbaraj et al. | |
| 8,797,159 B2 | 8/2014 | Kirkpatrick et al. | |
| 8,799,537 B1 | 8/2014 | Zhu et al. | |
| 8,879,250 B2 | 11/2014 | Franz et al. | |
| 8,884,896 B2 | 11/2014 | Tabone et al. | |
| 8,896,656 B2 | 11/2014 | Epstein et al. | |
| 8,909,842 B2 | 12/2014 | Johnson | |
| 8,913,380 B2 | 12/2014 | Enomoto et al. | |
| 8,990,469 B2 | 3/2015 | Benhard et al. | |
| 9,013,283 B1 | 4/2015 | Tackaberry | |
| 9,033,228 B2 * | 5/2015 | Govindarajan | G06Q 90/00 |
| | | | 235/383 |
| 9,152,177 B2 | 10/2015 | Feldstein | |
| 9,189,751 B2 | 11/2015 | Matsuoka et al. | |
| 9,224,290 B1 | 12/2015 | Mason et al. | |
| 9,249,927 B2 | 2/2016 | Graham | |
| 9,274,994 B2 | 3/2016 | Capezza | |
| 9,304,545 B2 | 4/2016 | Ramirez et al. | |
| 9,338,268 B2 | 5/2016 | Holtman | |
| 9,377,814 B2 | 6/2016 | Ramirez et al. | |
| 9,392,427 B2 | 7/2016 | Goldman | |
| 9,411,551 B2 | 8/2016 | Haren | |
| 9,456,686 B2 | 10/2016 | Epstein | |
| 9,531,651 B1 | 12/2016 | Cherubini | |
| 9,602,760 B2 | 3/2017 | Griffin et al. | |
| 9,612,628 B2 | 4/2017 | Halim et al. | |
| 9,647,481 B2 | 5/2017 | Huang et al. | |
| 9,696,777 B2 | 7/2017 | Pamley et al. | |
| 9,723,358 B1 | 8/2017 | Chan | |
| 9,736,427 B1 | 8/2017 | Grimshaw et al. | |
| 9,760,116 B2 | 9/2017 | Wylie | |
| 9,778,779 B2 | 10/2017 | Chartier et al. | |
| 9,794,496 B2 | 10/2017 | Soffer et al. | |
| 9,829,333 B1 | 11/2017 | Calder | |
| 9,838,475 B2 | 12/2017 | Brown et al. | |
| 9,961,306 B1 * | 5/2018 | Lev | H04R 1/028 |
| 10,001,807 B2 | 6/2018 | Chung et al. | |
| 10,108,221 B1 | 10/2018 | Jin et al. | |
| 10,354,531 B1 | 7/2019 | Bronder et al. | |
| 10,452,096 B1 | 10/2019 | Keilers et al. | |
| 10,462,611 B1 | 10/2019 | Klinkner et al. | |
| 10,499,531 B2 | 12/2019 | Schmidt et al. | |
| 10,623,701 B1 | 4/2020 | Bracewell et al. | |
| 10,663,498 B2 | 5/2020 | Decamp et al. | |
| 10,782,735 B2 | 9/2020 | Wylie | |
| 10,962,248 B1 | 3/2021 | Hasan et al. | |
| 11,017,334 B2 | 5/2021 | Decamp et al. | |
| 11,138,581 B2 * | 10/2021 | Fernando | G06F 1/1696 |
| 11,231,448 B2 | 1/2022 | Decamp et al. | |
| 11,360,534 B2 | 6/2022 | Decamp et al. | |
| 2002/0080132 A1 | 6/2002 | Dai et al. | |
| 2002/0095533 A1 | 7/2002 | Esterberg et al. | |
| 2002/0119800 A1 | 8/2002 | Jaggers et al. | |
| 2003/0084222 A1 | 5/2003 | Wurzburg | |
| 2003/0107566 A1 | 6/2003 | Shin et al. | |
| 2003/0114206 A1 | 6/2003 | Timothy et al. | |
| 2003/0154293 A1 | 8/2003 | Zmolek et al. | |
| 2003/0182150 A1 | 9/2003 | Reddy | |
| 2003/0217098 A1 | 11/2003 | Bobde et al. | |
| 2003/0217142 A1 | 11/2003 | Bobde et al. | |
| 2003/0222149 A1 | 12/2003 | Solomon et al. | |
| 2003/0222848 A1 | 12/2003 | Solomon et al. | |
| 2004/0064621 A1 | 4/2004 | Dougherty et al. | |
| 2004/0088465 A1 | 5/2004 | Bianchi | |
| 2004/0095713 A1 | 5/2004 | Chuang | |
| 2004/0111382 A1 | 6/2004 | Haji-Ioannou | |
| 2004/0116149 A1 | 6/2004 | Yukie et al. | |
| 2004/0125777 A1 | 7/2004 | Doyle et al. | |
| 2004/0212586 A1 | 10/2004 | Denny | |
| 2004/0268163 A1 | 12/2004 | Yeh | |
| 2005/0033481 A1 | 2/2005 | Budhraja et al. | |
| 2005/0036283 A1 * | 2/2005 | Hillman | F16M 11/14 |
| | | | 248/278.1 |
| 2005/0057893 A1 * | 3/2005 | Homer | G06F 1/16 |
| | | | 361/679.29 |
| 2005/0114503 A1 | 5/2005 | Ruetschi et al. | |
| 2005/0162824 A1 | 7/2005 | Thompson | |
| 2005/0164545 A1 | 7/2005 | Rosenthal et al. | |
| 2005/0180086 A1 | 8/2005 | Schaefer et al. | |
| 2005/0207110 A1 | 9/2005 | Wang et al. | |
| 2005/0213298 A1 | 9/2005 | Doherty et al. | |
| 2005/0245115 A1 | 11/2005 | Bell et al. | |
| 2005/0246421 A1 | 11/2005 | Moore | |
| 2006/0005055 A1 | 1/2006 | Potega | |
| 2006/0031454 A1 | 2/2006 | Ewing et al. | |
| 2006/0061958 A1 | 3/2006 | Solomon et al. | |
| 2006/0061961 A1 * | 3/2006 | Yin | G06F 1/1632 |
| | | | 361/679.44 |
| 2006/0075286 A1 | 4/2006 | Hodge et al. | |
| 2006/0095641 A1 | 5/2006 | Pandit et al. | |
| 2006/0103504 A1 | 5/2006 | Vassallo | |
| 2006/0112375 A1 | 5/2006 | Schneider | |
| 2006/0123807 A1 | 6/2006 | Sullivan et al. | |
| 2006/0161713 A1 | 7/2006 | Belady | |
| 2006/0205381 A1 | 9/2006 | Beart et al. | |
| 2006/0250764 A1 | 11/2006 | Howarth et al. | |
| 2006/0250765 A1 | 11/2006 | Howarth et al. | |
| 2006/0250767 A1 | 11/2006 | Brophy et al. | |
| 2007/0030276 A1 | 2/2007 | MacInnis et al. | |
| 2007/0033289 A1 | 2/2007 | Nuyttens et al. | |
| 2007/0054550 A1 | 3/2007 | Cuthbert et al. | |
| 2007/0055740 A1 | 3/2007 | Luciani et al. | |
| 2007/0058332 A1 | 3/2007 | Canterbury et al. | |
| 2007/0065078 A1 | 3/2007 | Jiang | |

(56) References Cited

U.S. PATENT DOCUMENTS

| | | |
|---|---|---|
| 2007/0070598 A1 | 3/2007 | Chuang |
| 2007/0074284 A1 | 3/2007 | Woog |
| 2007/0097618 A1 | 5/2007 | Searby et al. |
| 2007/0101039 A1 | 5/2007 | Rutledge et al. |
| 2007/0120874 A1 | 5/2007 | MacInnis et al. |
| 2007/0130323 A1 | 6/2007 | Landsman et al. |
| 2007/0168593 A1 | 7/2007 | Montag et al. |
| 2008/0024975 A1 | 1/2008 | Huang et al. |
| 2008/0036780 A1 | 2/2008 | Liang et al. |
| 2008/0053770 A1 | 3/2008 | Tynyk |
| 2008/0119241 A1 | 5/2008 | Dorogusker et al. |
| 2008/0126594 A1 | 5/2008 | Monks et al. |
| 2008/0194119 A1 | 8/2008 | Mori |
| 2008/0239681 A1 | 10/2008 | Iida |
| 2008/0244026 A1 | 10/2008 | Holt et al. |
| 2008/0313108 A1 | 12/2008 | Carrabis |
| 2009/0058359 A1 | 3/2009 | Fischer et al. |
| 2009/0066704 A1 | 3/2009 | Daniel et al. |
| 2009/0072782 A1 | 3/2009 | Randall |
| 2009/0079264 A1 | 3/2009 | Minami |
| 2009/0079416 A1 | 3/2009 | Vinden et al. |
| 2009/0125743 A1 | 5/2009 | Robertson et al. |
| 2009/0158423 A1 | 6/2009 | Orlassino et al. |
| 2009/0177906 A1 | 7/2009 | Paniagua, Jr. et al. |
| 2009/0228614 A1 | 9/2009 | Hwang |
| 2009/0247006 A1 | 10/2009 | Thompson |
| 2009/0254313 A1 | 10/2009 | Armour et al. |
| 2009/0302799 A1 | 12/2009 | Marquet et al. |
| 2009/0309748 A1 | 12/2009 | Elgort et al. |
| 2010/0037283 A1 | 2/2010 | Zhu |
| 2010/0066685 A1 | 3/2010 | Cain et al. |
| 2010/0070217 A1 | 3/2010 | Shimada et al. |
| 2010/0081473 A1 | 4/2010 | Chatterjee et al. |
| 2010/0088140 A1 | 4/2010 | Gil et al. |
| 2010/0128766 A1 | 5/2010 | Sugita |
| 2010/0138582 A1 | 6/2010 | Bird et al. |
| 2010/0174419 A1 | 7/2010 | Brumfield et al. |
| 2010/0182262 A1 | 7/2010 | Yoshikawa et al. |
| 2010/0188808 A1 | 7/2010 | Howarth et al. |
| 2010/0191487 A1 | 7/2010 | Rada et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2010/0302454 A1 | 12/2010 | Epstein et al. |
| 2011/0001486 A1 | 1/2011 | Abouda et al. |
| 2011/0035443 A1 | 2/2011 | Jensen |
| 2011/0069445 A1 | 3/2011 | Haren et al. |
| 2011/0085816 A1 | 4/2011 | Kim |
| 2011/0105226 A1 | 5/2011 | Perlman |
| 2011/0145466 A1 | 6/2011 | Supran et al. |
| 2011/0179291 A1 | 7/2011 | Weng et al. |
| 2011/0181238 A1 | 7/2011 | Soar |
| 2011/0204843 A1 | 8/2011 | Foster |
| 2011/0208980 A1 | 8/2011 | Brooks et al. |
| 2011/0239008 A1 | 9/2011 | Lam et al. |
| 2011/0246679 A1 | 10/2011 | Sretenovic |
| 2011/0266997 A1 | 11/2011 | Krancher et al. |
| 2011/0273632 A1 | 11/2011 | Casey |
| 2011/0292640 A1 | 12/2011 | Clark et al. |
| 2011/0297566 A1 | 12/2011 | Gallagher et al. |
| 2012/0034951 A1 | 2/2012 | Jones et al. |
| 2012/0054400 A1 | 3/2012 | Iverson et al. |
| 2012/0068538 A1 | 3/2012 | Ye et al. |
| 2012/0081087 A1 | 4/2012 | Ching-Wei |
| 2012/0110360 A1 | 5/2012 | Lin et al. |
| 2012/0120581 A1 | 5/2012 | Haren |
| 2012/0155013 A1 | 6/2012 | Huang |
| 2012/0166115 A1 | 6/2012 | Apostolakis |
| 2012/0170212 A1* | 7/2012 | Gallouzi ............ F16M 11/38 |
| | | 361/679.56 |
| 2012/0188087 A1 | 7/2012 | Wang |
| 2012/0203949 A1 | 8/2012 | Benhard et al. |
| 2012/0229076 A1 | 9/2012 | Zhu et al. |
| 2012/0275526 A1 | 11/2012 | Hughes |
| 2012/0278640 A1 | 11/2012 | Caglianone |
| 2012/0314777 A1 | 12/2012 | Zhang et al. |
| 2013/0010418 A1 | 1/2013 | Flynn et al. |
| 2013/0050216 A1 | 2/2013 | Whitby-Strevens et al. |
| 2013/0054348 A1 | 2/2013 | Holsman et al. |
| 2013/0057567 A1 | 3/2013 | Frank et al. |
| 2013/0060662 A1 | 3/2013 | Carlson et al. |
| 2013/0073882 A1 | 3/2013 | Inbaraj et al. |
| 2013/0106979 A1 | 5/2013 | Chang et al. |
| 2013/0115826 A1 | 5/2013 | Sloey et al. |
| 2013/0143521 A1 | 6/2013 | Hernandez et al. |
| 2013/0159756 A1 | 6/2013 | Ellis |
| 2013/0165046 A1 | 6/2013 | Tang et al. |
| 2013/0205060 A1 | 8/2013 | Benhard et al. |
| 2013/0262248 A1 | 10/2013 | Kim et al. |
| 2013/0311801 A1 | 11/2013 | Kong et al. |
| 2013/0326495 A1 | 12/2013 | Reunamaki et al. |
| 2014/0028462 A1 | 1/2014 | Lawson |
| 2014/0117780 A1 | 5/2014 | Buchheim et al. |
| 2014/0136749 A1 | 5/2014 | North et al. |
| 2014/0150812 A1 | 6/2014 | Liao |
| 2014/0168884 A1* | 6/2014 | Wylie ................ G06F 1/1632 |
| | | 361/679.43 |
| 2014/0172478 A1 | 6/2014 | Vadasz |
| 2014/0172731 A1 | 6/2014 | Ericksen et al. |
| 2014/0181350 A1 | 6/2014 | Pedro et al. |
| 2014/0208134 A1 | 7/2014 | Waters et al. |
| 2014/0244869 A1 | 8/2014 | Adrian et al. |
| 2014/0274204 A1 | 9/2014 | Williams et al. |
| 2014/0278645 A1 | 9/2014 | Davidson et al. |
| 2014/0301575 A1 | 10/2014 | Holtman et al. |
| 2014/0316584 A1 | 10/2014 | Matsuoka et al. |
| 2014/0342669 A1 | 11/2014 | Zeung et al. |
| 2014/0355200 A1 | 12/2014 | Thiers |
| 2014/0359318 A1 | 12/2014 | Liu et al. |
| 2014/0365396 A1 | 12/2014 | Kumar et al. |
| 2015/0006026 A1 | 1/2015 | Schaffer et al. |
| 2015/0013010 A1 | 1/2015 | Rozenweig |
| 2015/0035939 A1 | 2/2015 | Hillier et al. |
| 2015/0036051 A1 | 2/2015 | Broberg et al. |
| 2015/0043154 A1* | 2/2015 | Feldstein ............ G06F 1/1632 |
| | | 29/857 |
| 2015/0046623 A1 | 2/2015 | Ramirez et al. |
| 2015/0081381 A1 | 3/2015 | Okoba |
| 2015/0082061 A1 | 3/2015 | Ramirez et al. |
| 2015/0106814 A1 | 4/2015 | Vilke et al. |
| 2015/0169477 A1 | 6/2015 | Beel et al. |
| 2015/0170497 A1 | 6/2015 | Thuersam et al. |
| 2015/0195489 A1 | 7/2015 | Sobti et al. |
| 2015/0237191 A1 | 8/2015 | Moran et al. |
| 2015/0281627 A1 | 10/2015 | Wang et al. |
| 2015/0295440 A1 | 10/2015 | Liao |
| 2015/0333789 A1 | 11/2015 | An |
| 2015/0346792 A1 | 12/2015 | Rathi et al. |
| 2015/0356045 A1 | 12/2015 | Soffer |
| 2015/0370681 A1 | 12/2015 | Tonry et al. |
| 2015/0378420 A1 | 12/2015 | Ippolito et al. |
| 2016/0007083 A1 | 1/2016 | Gurha |
| 2016/0026883 A1 | 1/2016 | Matos |
| 2016/0050375 A1 | 2/2016 | Soffer et al. |
| 2016/0065633 A1 | 3/2016 | Kawakubo |
| 2016/0091926 A1* | 3/2016 | Saxton ................ G06F 1/1632 |
| | | 710/304 |
| 2016/0173678 A1 | 6/2016 | Decamp |
| 2016/0187963 A1 | 6/2016 | Leinonen et al. |
| 2016/0193932 A1 | 7/2016 | Pedram |
| 2016/0195856 A1 | 7/2016 | Spero |
| 2016/0195897 A1 | 7/2016 | Robinson |
| 2016/0227381 A1 | 8/2016 | Bargetzi et al. |
| 2016/0285301 A1 | 9/2016 | Kim |
| 2016/0285310 A1 | 9/2016 | Tan et al. |
| 2016/0302320 A1* | 10/2016 | Kim ................ G06F 1/1698 |
| 2016/0308929 A1 | 10/2016 | Fu |
| 2016/0321333 A1 | 11/2016 | Oka |
| 2016/0364224 A1 | 12/2016 | Tuukkanen |
| 2017/0024197 A1 | 1/2017 | Pantelka et al. |
| 2017/0054734 A1 | 2/2017 | Sigal et al. |
| 2017/0068913 A1 | 3/2017 | Pignataro et al. |
| 2017/0070090 A1 | 3/2017 | Miller |
| 2017/0099361 A1 | 4/2017 | Digilov et al. |

(56) References Cited

U.S. PATENT DOCUMENTS

| | | |
|---|---|---|
| 2017/0123456 A1 | 5/2017 | Chung et al. |
| 2017/0140235 A1 | 5/2017 | Yu et al. |
| 2017/0150812 A1* | 6/2017 | Tomomatsu ............ H04M 1/04 |
| 2017/0177029 A1 | 6/2017 | Nguyen et al. |
| 2017/0255452 A1 | 9/2017 | Barnes et al. |
| 2017/0262779 A1 | 9/2017 | Remaker |
| 2017/0325318 A1 | 11/2017 | Wendt et al. |
| 2017/0336846 A1 | 11/2017 | Shieh et al. |
| 2017/0345290 A1 | 11/2017 | Law et al. |
| 2017/0351638 A1 | 12/2017 | Chen et al. |
| 2017/0374114 A1 | 12/2017 | Feldman |
| 2018/0017992 A1 | 1/2018 | Wylie |
| 2018/0067885 A1 | 3/2018 | Hsieh et al. |
| 2018/0103212 A1 | 4/2018 | Epstein et al. |
| 2018/0131148 A1 | 5/2018 | Liu |
| 2018/0143664 A1 | 5/2018 | Wylie |
| 2018/0143665 A1 | 5/2018 | Wylie |
| 2018/0143934 A1 | 5/2018 | Li |
| 2018/0189730 A1 | 7/2018 | Wilkinson et al. |
| 2018/0191113 A1 | 7/2018 | Byrne et al. |
| 2018/0198248 A1 | 7/2018 | Sun et al. |
| 2018/0267681 A1 | 9/2018 | Epstein |
| 2018/0324393 A1 | 11/2018 | Ryan et al. |
| 2018/0338368 A1 | 11/2018 | Pfund et al. |
| 2019/0005476 A1* | 1/2019 | Luo ....................... G06F 1/1632 |
| 2019/0018811 A1 | 1/2019 | Hundal et al. |
| 2019/0025353 A1 | 1/2019 | Decamp |
| 2019/0025354 A1 | 1/2019 | Decamp |
| 2019/0025355 A1 | 1/2019 | Decamp |
| 2019/0197009 A1 | 6/2019 | Chen et al. |
| 2019/0228348 A1 | 7/2019 | O'Keefe-Sally et al. |
| 2019/0243419 A1* | 8/2019 | Charlesworth ........ A45C 11/00 |
| 2019/0272141 A1 | 9/2019 | Poel et al. |
| 2019/0273754 A1 | 9/2019 | Ting |
| 2019/0303342 A1 | 10/2019 | Jen et al. |
| 2019/0354361 A1 | 11/2019 | Gang et al. |
| 2019/0361407 A1 | 11/2019 | Vogel et al. |
| 2019/0389064 A1 | 12/2019 | High et al. |
| 2019/0392356 A1 | 12/2019 | Munir et al. |
| 2020/0104762 A1 | 4/2020 | Gibson et al. |
| 2020/0133368 A1 | 4/2020 | Volek et al. |
| 2020/0218324 A1 | 7/2020 | Decamp et al. |
| 2020/0219036 A1 | 7/2020 | Decamp et al. |
| 2020/0241597 A1 | 7/2020 | Decamp et al. |
| 2020/0256902 A1 | 8/2020 | Decamp et al. |
| 2020/0257517 A1 | 8/2020 | Seater et al. |
| 2020/0259805 A1 | 8/2020 | Grobelny et al. |
| 2020/0326955 A1 | 10/2020 | Adiletta et al. |
| 2020/0348724 A1 | 11/2020 | Vroom et al. |
| 2021/0051298 A1 | 2/2021 | Atkins et al. |
| 2021/0058584 A1 | 2/2021 | Decamp et al. |
| 2021/0072792 A1 | 3/2021 | Decamp et al. |
| 2021/0073155 A1 | 3/2021 | Decamp et al. |
| 2021/0097565 A1 | 4/2021 | Subbloie et al. |
| 2021/0119930 A1 | 4/2021 | Debbage et al. |
| 2021/0181794 A1 | 6/2021 | Chung et al. |
| 2021/0191462 A1 | 6/2021 | Decamp et al. |
| 2021/0233010 A1 | 7/2021 | Decamp et al. |
| 2021/0258538 A1 | 8/2021 | Decamp, II et al. |
| 2021/0286580 A1 | 9/2021 | Tian |
| 2022/0011382 A1 | 1/2022 | Chiang et al. |
| 2022/0210225 A1 | 6/2022 | Shilimkar et al. |

FOREIGN PATENT DOCUMENTS

| | | |
|---|---|---|
| CN | 104094187 | 10/2014 |
| CN | 104838558 | 8/2015 |
| CN | 105593782 | 5/2016 |
| CN | 106707834 | 5/2017 |
| CN | 107274660 A | 10/2017 |
| CN | 107702282 A | 2/2018 |
| DE | 102013104216 | 11/2013 |
| EP | 1085400 A2 | 3/2001 |
| EP | 2645343 A2 | 10/2013 |
| EP | 2722728 | 4/2014 |
| EP | 2722728 A1 | 4/2014 |
| EP | 2823372 | 1/2015 |
| EP | 2929613 | 10/2015 |
| EP | 3030948 | 6/2016 |
| EP | 3087476 | 11/2016 |
| GB | 2457252 A | 8/2009 |
| GB | 2513197 A | 10/2014 |
| GB | 2530021 A | 3/2016 |
| IN | 201617004084 | 12/2015 |
| IN | 201406041 | 1/2016 |
| JP | 2013239178 | 11/2013 |
| JP | 6110878 | 5/2015 |
| JP | 2016504900 | 2/2016 |
| KR | 1020090069890 A | 7/2009 |
| KR | 20100000082 U | 1/2010 |
| KR | 20140069684 A | 6/2014 |
| KR | 1020140069684 | 6/2014 |
| KR | 101452319 | 10/2014 |
| KR | 20150091362 | 8/2015 |
| KR | 20150130842 A | 11/2015 |
| KR | 1020150130842 | 11/2015 |
| KR | 20160121116 A * | 10/2016 |
| KR | 2020100000082 | 1/2020 |
| RU | 2630376 | 7/2017 |
| TW | I387182 B1 | 2/2013 |
| TW | 201347581 | 11/2013 |
| WO | 03030304 A2 | 4/2003 |
| WO | 2005003983 A1 | 1/2005 |
| WO | 2008109193 A1 | 9/2008 |
| WO | 2011138581 A2 | 11/2011 |
| WO | 2012094526 A1 | 7/2012 |
| WO | 2013024855 A1 | 2/2013 |
| WO | 2013033573 A2 | 3/2013 |
| WO | 2014172678 A1 | 10/2014 |
| WO | 2016011566 A1 | 1/2016 |
| WO | 2017140474 | 8/2017 |
| WO | 2018216004 A1 | 11/2018 |
| WO | 20018216004 A1 | 11/2018 |
| WO | 2019018007 | 1/2019 |
| WO | 2020142525 A1 | 7/2020 |
| WO | 2020231583 A1 | 11/2020 |
| WO | 2021035156 A1 | 2/2021 |
| WO | 2021050215 A1 | 3/2021 |
| WO | 2021050575 A1 | 3/2021 |

OTHER PUBLICATIONS

PCT/US2020/049980, International Search Report and Written Opinion, dated Nov. 27, 2020, 15 pages.
PCT/US2019/067581, International Search Report and Written Opinion, dated Apr. 23, 2020, 10 pages.
U.S. Appl. No. 16/849,858, Non-Final Office Action, dated Jun. 26, 2020, 12 pages.
U.S. Appl. No. 16/240,124, Notice of Allowance, dated Feb. 22, 2021, 9 pages.
PCT/US2019/069120, International Search Report and Written Opinion, dated Apr. 29, 2020, 11 pages.
Wikipedia, "USB", https://web.archive.org/web/20141024053934/https://en.wikipedia.org/wiki/USB, Oct. 24, 2014, 42 pages.
U.S. Appl. No. 16/446,440, Non-Final Office Action, dated Sep. 16, 2021, 15 pages.
U.S. Appl. No. 16/240,124, Non-Final Office Action, dated Nov. 13, 2020, 30 pages.
Agnihotri, Mohit, et al., "Topology Formation in Mesh Networks Considering Role Suitability", Workshop on Device Communications for 5G Networks, WD5G, 2016, 7 pages.
Dell, "Dell Docking Station WD15 User Guide", 2015, 31 pages.
U.S. Appl. No. 16/999,778, et al., Notice of Allowance, dated Mar. 19, 2021, 13 pages.
U.S. Appl. No. 16/999,778, et al., Non-Final Office Action, dated Nov. 13, 2020, 16 pages.
PCT/US2020/046703, International Search Report and Written Opinion, dated Jan. 13, 2021, 12 pages.
U.S. Appl. No. 16/849,858, Notice of Allowance, dated Jan. 22, 2021, 8 pages.

(56) References Cited

OTHER PUBLICATIONS

U.S. Appl. No. 13/365,754, Final Office Action, dated Dec. 27, 2013, 18 pgs.
U.S. Appl. No. 13/365,754, Notice of Allowance, dated Feb. 4, 2015, 8 pgs.
U.S. Appl. No. 13/365,754, Final Office Action, dated Jun. 10, 2014, 22 pgs.
U.S. Appl. No. 13/365,754, Non-Final Office Action, dated May 13, 2014, 18 pgs.
U.S. Appl. No. 13/365,754, Non-Final Office Action, dated Sep. 10, 2013, 15 pgs.
U.S. Appl. No. 13/365,754, Non-Final Office Action, dated Sep. 17, 2014, 25 pgs.
U.S. Appl. No. 13/786,038, Non-Final Office Action, dated Sep. 18, 2014, 24 pgs.
U.S. Appl. No. 14/634,196, Non-Final Office Action, dated Sep. 7, 2016, 25 pgs.
U.S. Appl. No. 14/923,833, Final Office Action, dated Aug. 9, 2017, 22 pgs.
U.S. Appl. No. 15/905,241, Non-Final Office Action, dated Nov. 2, 2018, 34 pgs.
U.S. Appl. No. 14/923,833, Notice of Allowance, dated Dec. 18, 2017, 5 pgs.
U.S. Appl. No. 14/923,833, Non-Final Office Action, dated Mar. 2, 2017, 22 pgs.
U.S. Appl. No. 14/923,833, Non-Final Office Action, dated Nov. 1, 2016, 14 pgs.
U.S. Appl. No. 14/970,318, Notice of Allowance, dated Dec. 6, 2017, 11 pgs.
U.S. Appl. No. 14/970,318, Non-Final Office Action, dated Feb. 6, 2017, 21 pgs.
U.S. Appl. No. 14/970,318, Non-Final Office Action, dated Jul. 11, 2017, 15 pgs.
U.S. Appl. No. 14/970,318, Final Office Action, dated Jul. 11, 2017, 25 pgs.
U.S. Appl. No. 14/970,318, Non-Final Office Action, dated Oct. 14, 2016, 13 pgs.
U.S. Appl. No. 14/970,318, Advisory Action, dated Sep. 28, 2017, 3 pgs.
U.S. Appl. No. 15/261,204, Non-Final Office Action, dated Apr. 30, 2018, 20 pgs.
U.S. Appl. No. 15/261,204, Advisory Action, dated Feb. 1, 2019, 7 pages.
U.S. Appl. No. 15/261,204, Notice of Allowance, dated Feb. 4, 2020, 8 pages.
U.S. Appl. No. 15/261,204, Non-Final Office Action, dated Jun. 27, 2019, 20 pages.
U.S. Appl. No. 15/261,204, Final Office Action, dated Nov. 2, 2018, 22 pgs.
U.S. Appl. No. 15/655,669, Final Office Action, dated May 16, 2019, 16 pages.
U.S. Appl. No. 15/655,699, Advisory Action, dated Aug. 1, 2019, 4 pages.
U.S. Appl. No. 15/655,699, Final Office Action, dated Feb. 7, 2020, 8 pages.
U.S. Appl. No. 15/655,699, Non-Final Office Action, dated Nov. 19, 2018, 37 pgs.
U.S. Appl. No. 15/655,699, Non-Final Office Action, dated Sep. 6, 2019, 18 pages.
U.S. Appl. No. 16/029,339, Final Office Action, dated Apr. 19, 2019, 14 pages.
U.S. Appl. No. 16/029,339, Non-Final Office Action, dated Aug. 8, 2019, 14 pages.
U.S. Appl. No. 16/029,339, Notice of Allowance, dated Dec. 4, 2019, 10 pages.
U.S. Appl. No. 16/029,339, Non-Final Office Action, dated Nov. 2, 2018, 28 pgs.
Dong, "Web-based Building Energy Consumption Monitoring and Conservation Service", 4th International Conference on Mechatronics, Materials, Chemistry and Computer Engineering (ICMMCCE 2015), pp. 3036-3040.
Fink, "Toshiba Dynadock V Review", Laptop Magazine, retrieved from the Internet on Dec. 21, 2013, at <http://www.laptopmag.com/review/accessories/Toshiba-dynadock-v.aspx>, Aug. 9, 2010, pp. 1-2.
Ganesh, "Visible Engergy UFO Power Center Smart Power Strip Review", AnandTech, http://www.anandtech.com/show/6413/visible-energy-ufo-power-center-smart-power-stripreview, Oct. 26, 2012.
PCT/US2017/048367, International Search Report and Written Opinion, dated Oct. 27, 2017, 15 pgs.
PCT/US2018/017232, International Search Report and Written Opinion, dated May 21, 2018, 13 pgs.
PCT/US2012/023717, International Search Report and Written Opinion, dated Aug. 30, 2012, 9 pgs.
PCT/US2014/017434, International Search Report and Written Opinion, dated Jun. 30, 2014, 8 pgs.
PCT/US2015/065730, International Search Report and Written Opinion, dated Apr. 6, 2016, 16 pgs.
U.S. Appl. No. 16/849,799 , Notice of Allowance, dated Oct. 8, 2021, 5 pages.
U.S. Appl. No. 17/308,351 , Non-Final Office Action, dated Nov. 15, 2021, 14 pages.
U.S. Appl. No. 17/308,351 , Notice of Allowance, dated Mar. 29, 2022, 5 pages.
U.S. Appl. No. 16/446,440, Notice of Allowance, dated Mar. 31, 2022, 8 pages.
U.S. Appl. No. 16/833,089, Non-Final Office Action, dated Apr. 8, 2022, 23 pages.
U.S. Appl. No. 17/229,547, Non-Final Office Action, dated Feb. 15, 2022, 24 pages.
U.S. Appl. No. 15/655,699, Notice of Allowance, dated Mar. 6, 2020, 7 pages.

\* cited by examiner

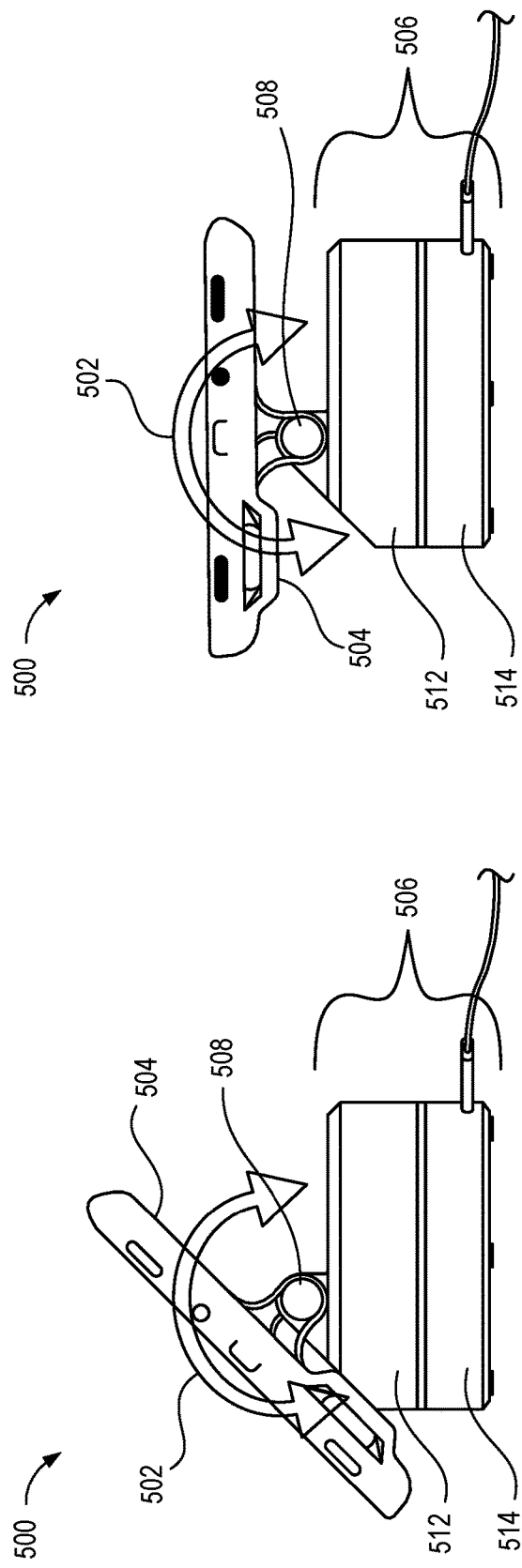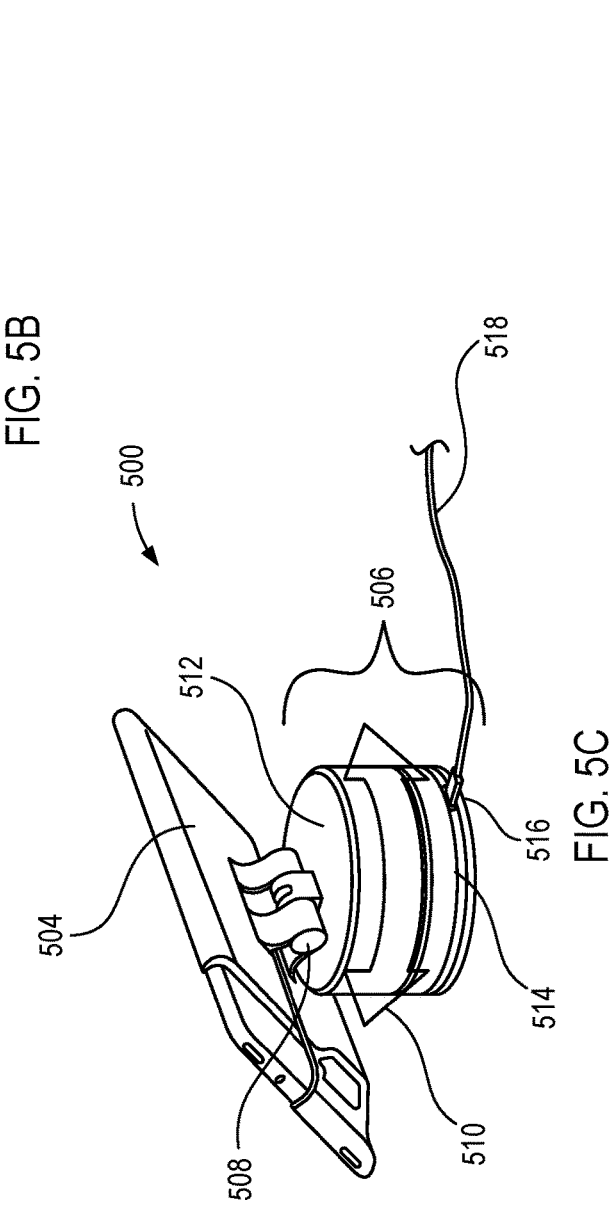

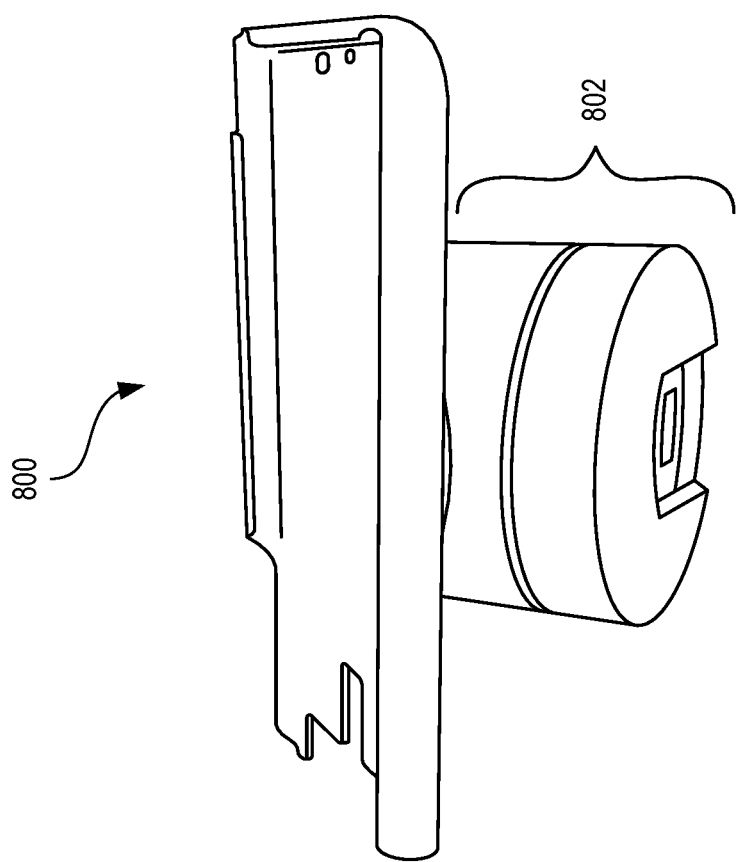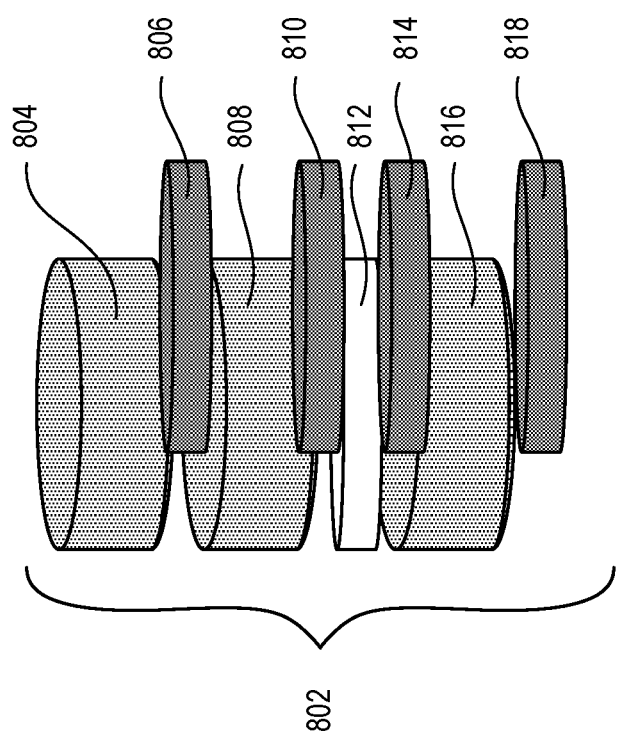
FIG. 8

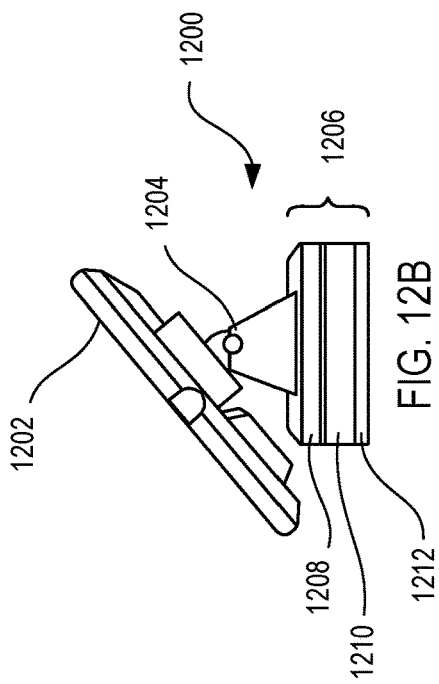
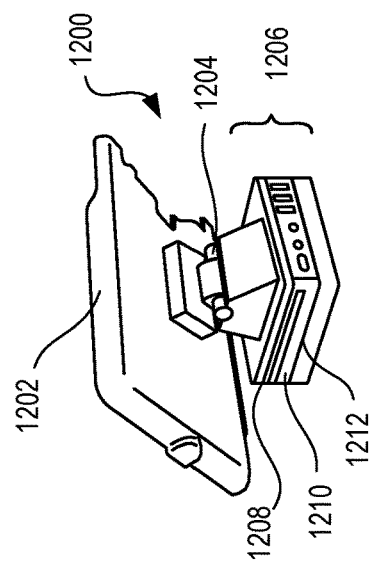
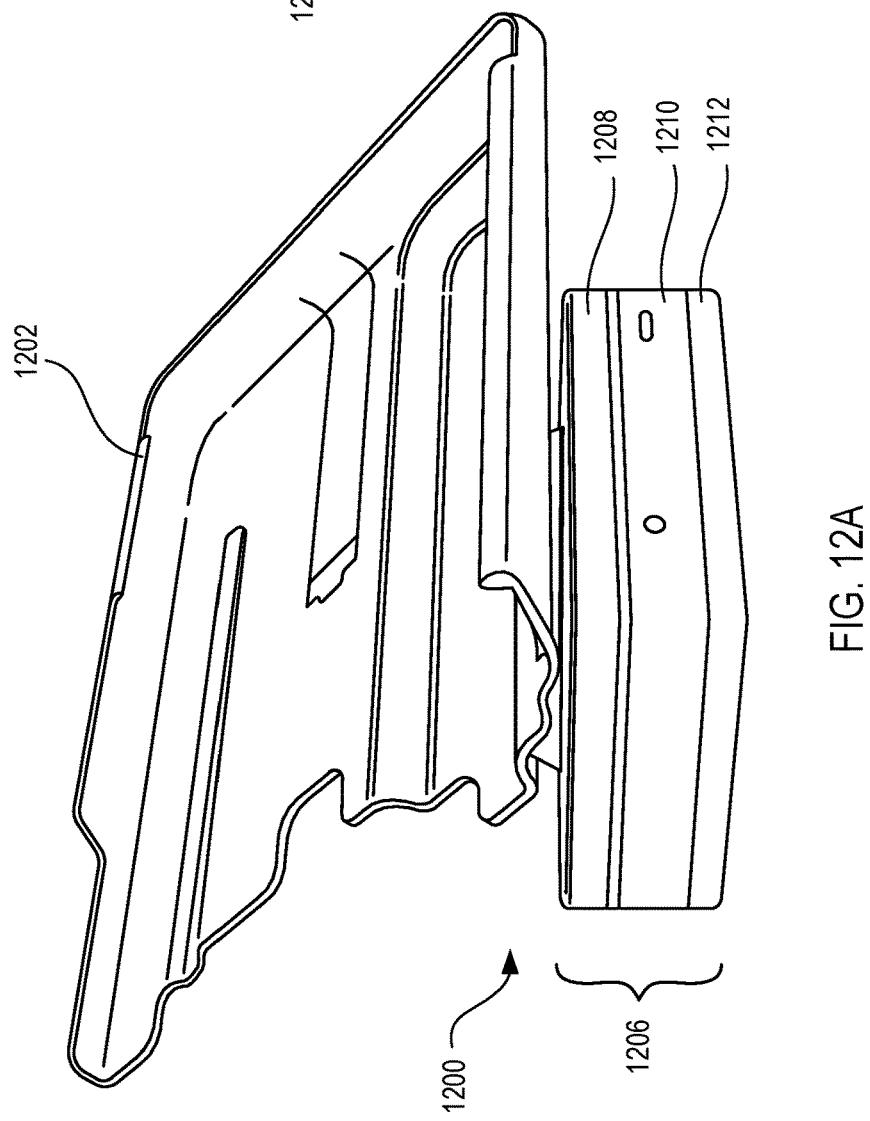

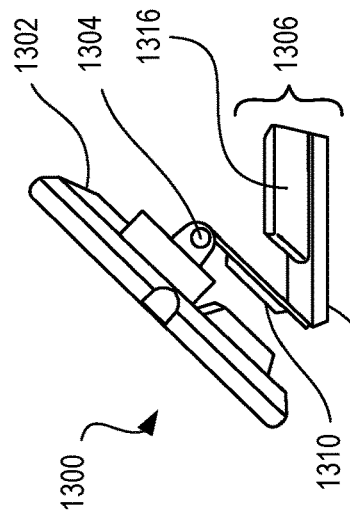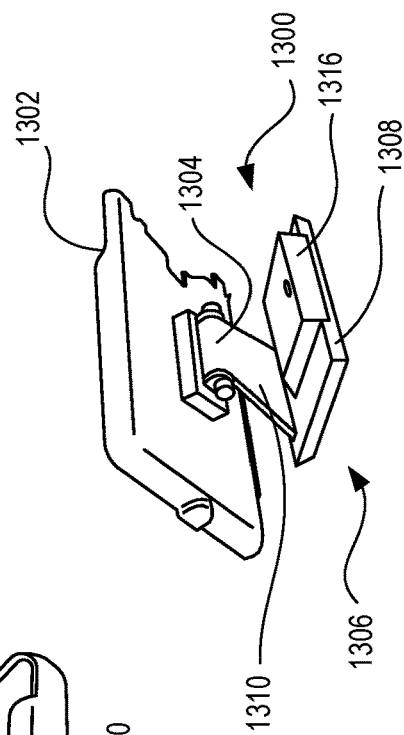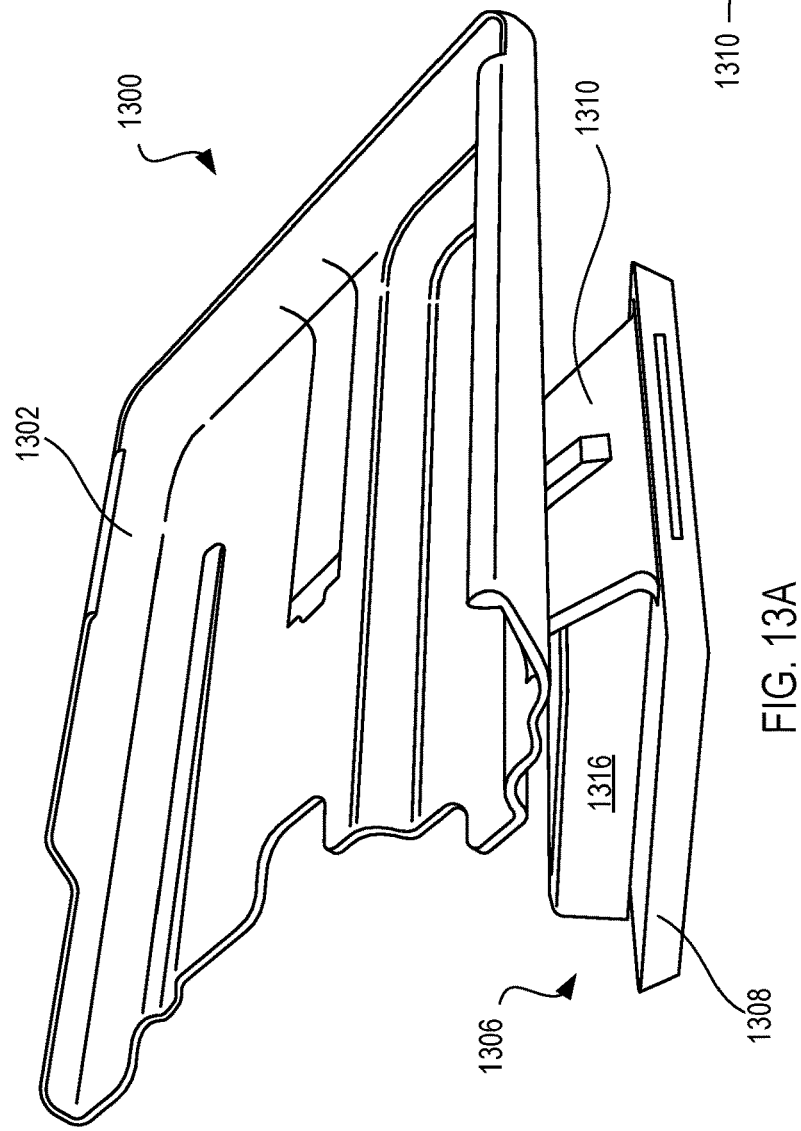
FIG. 13B
FIG. 13C
FIG. 13A

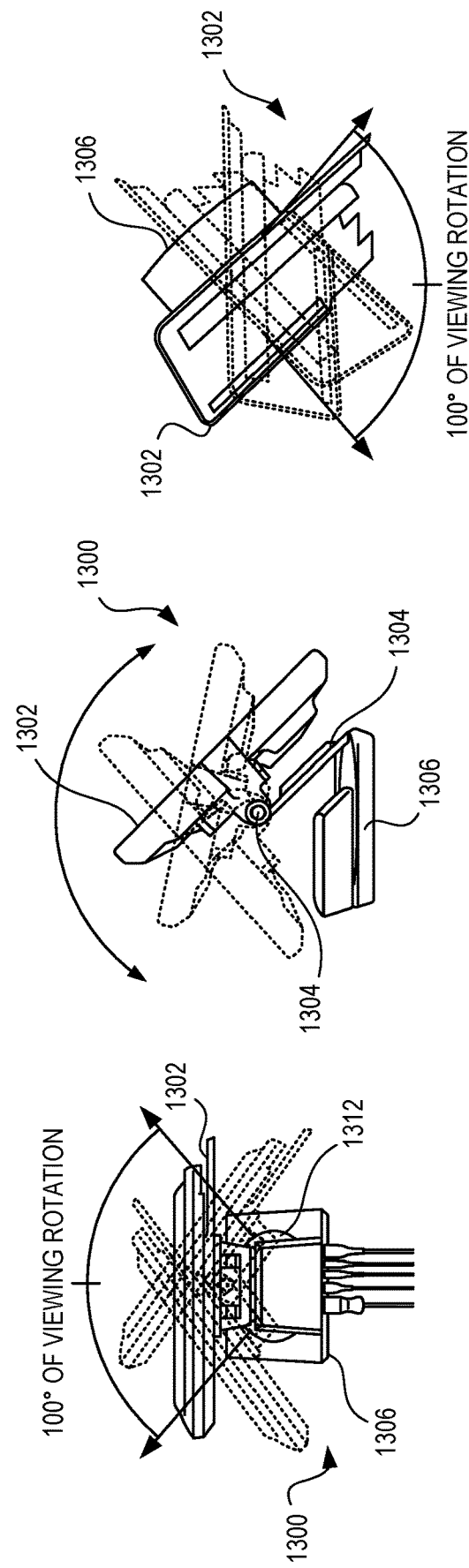

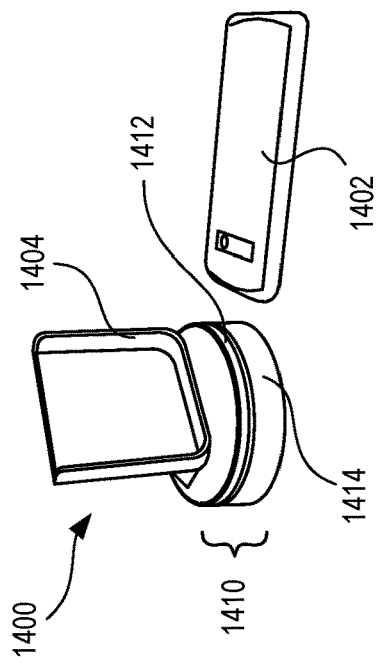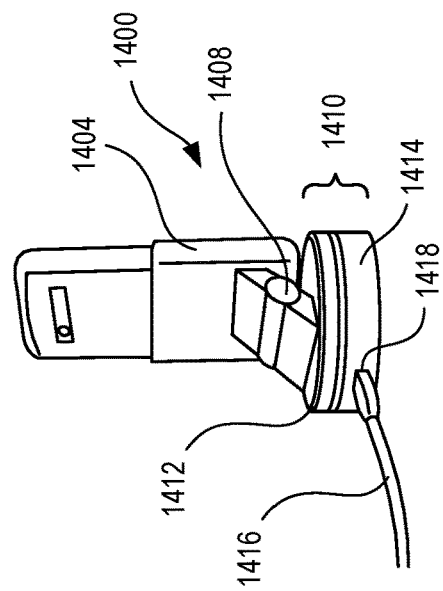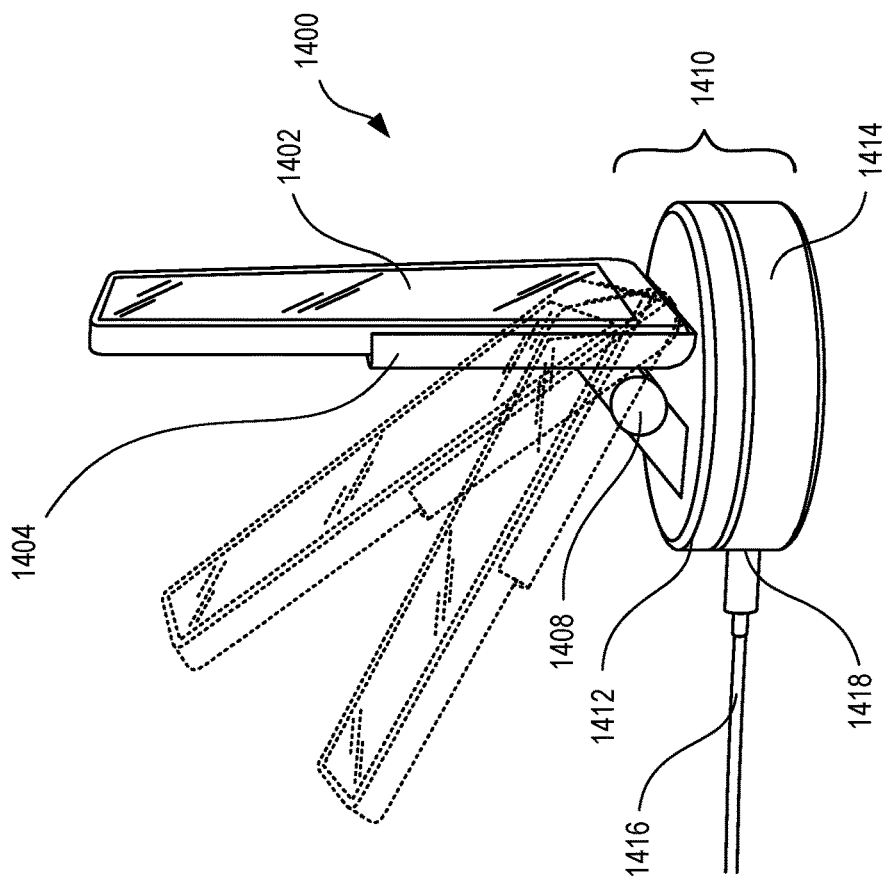

DISPLAY AND DOCKING APPARATUS FOR A PORTABLE ELECTRONIC DEVICE

RELATED APPLICATIONS

This application claims priority to U.S. Provisional Patent Application No. 62/782,224, filed on Dec. 19, 2018, which is hereby incorporated herein by reference.

TECHNICAL FIELD

This disclosure generally relates to portable electronic devices (PEDs), and, more specifically, to display apparatuses for portable electronic devices.

BRIEF DESCRIPTION OF THE DRAWINGS

FIGS. 5A-5C illustrate a plurality of pivots that are possible with various respective embodiments of a display and docking apparatus.

FIG. 8 illustrates the construction of a modular base of a docking stand assembly of a display and docking apparatus, according to an embodiment.

FIGS. 12A-12E illustrate an alternative embodiment of a display and docking apparatus.

FIGS. 13A-13H illustrate an alternative embodiment of a display and docking apparatus.

FIGS. 14A-14C illustrate an alternative embodiment of a display and docking apparatus.

DETAILED DESCRIPTION

Figure 1:
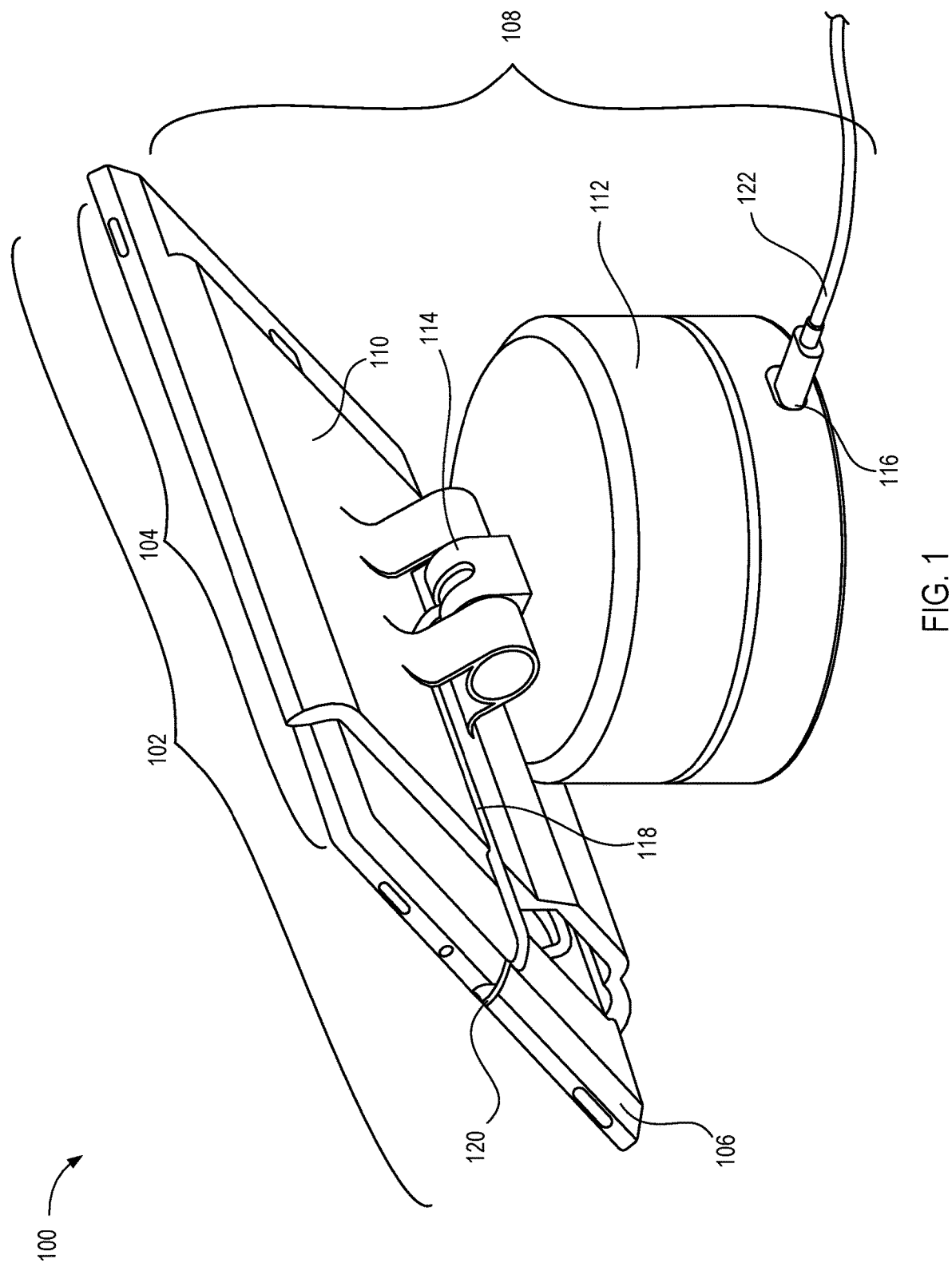
FIG. 1 illustrates a perspective view of a display and docking apparatus, according to an embodiment.
Figure 2:
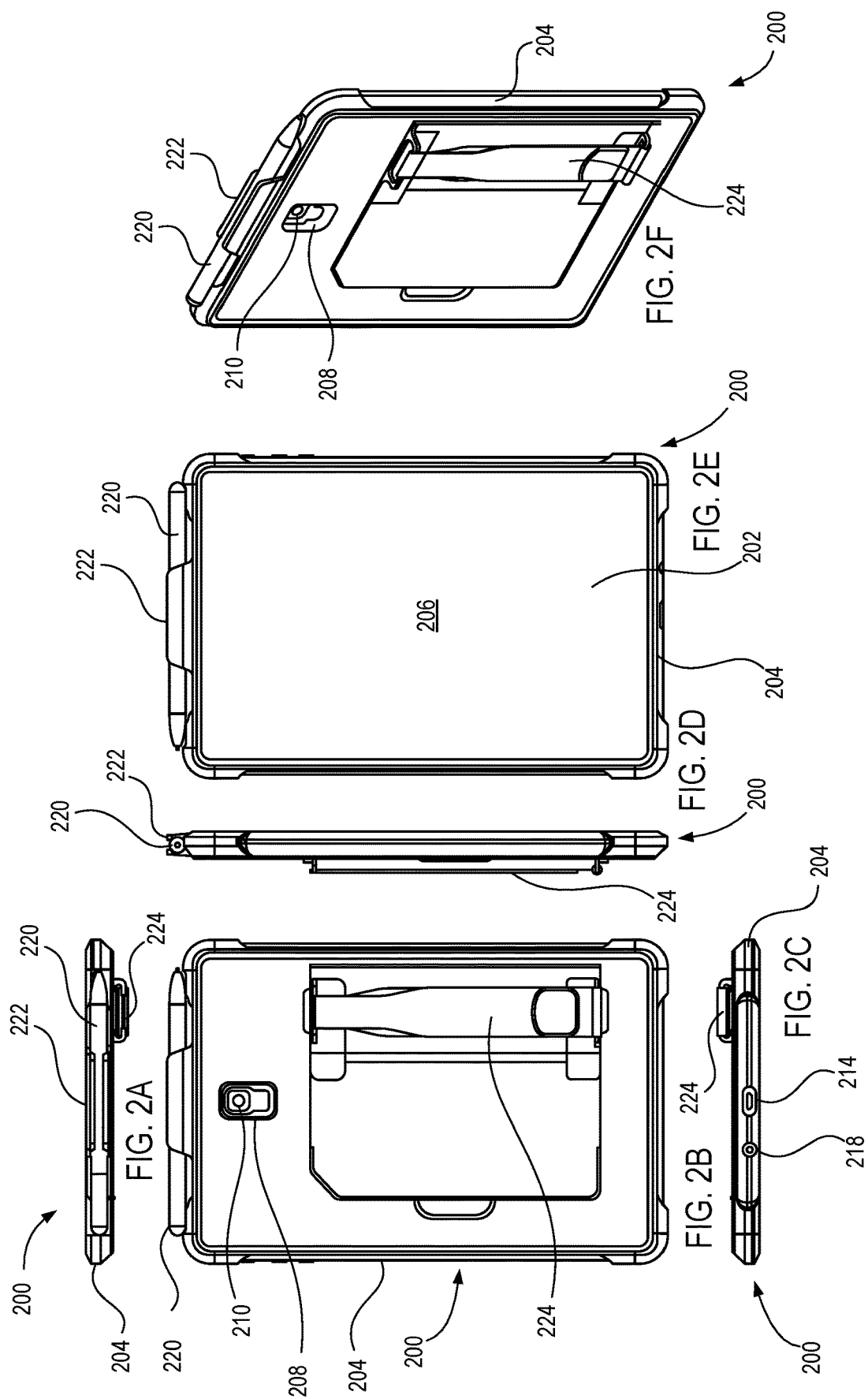
FIGS. 2A-2F illustrate various perspective views of a PED assembly of a display and docking apparatus, according to various embodiments.

Improvements to electronics design and manufacturing techniques over time have allowed for increasingly powerful electronics to be incorporated into a portable form factor. A portable electronic device (PED) in many cases incorporates a screen that facilitates a user's interaction with the PED by displaying data related to the workings of the device to the user. In many cases, the screen may be a touchscreen, which allows the screen to furthermore function as an input device for the user to use to issue instructions to the electronic device. These devices have the advantage of being able to be easily moved from one location to another. A PED may be a smartphone, a tablet computer, a laptop computer, a 2-in-1 computer, or any other portable electronic device.

In other cases, an electronic device may not be portable. It may be that a non-portable electronic device has a physical form factor that provides certain advantages over a portable design. For example, a non-portable electronic device with a touch screen may in some cases be used as a point of sale device. A point of sale non-portable electronic device may include a physical stand with a touch screen and associated electronics as a single integrated unit. The nature of the stand portion may be such that it stabilizes the touch screen portion of the non-portable electronic device at one or more points in space, allowing a user to operate the touch screen portion of the non-portable electronic device without the need to otherwise physically support the device.

Disclosure herein relates to embodiments of a display apparatus comprising a PED assembly that includes a PED and a case encasing the PED. The PED assembly is removably attachable to a docking stand assembly. Because the PED assembly is removably attached to the assembly, a user of the electronic device has the option to use the PED assembly in a portable mode, or in a non-portable stand mode, and can select between the two modes simply by removing the PED assembly from the docking stand assembly or placing the PED assembly back within the docking stand assembly. This allows the user to (alternately) enjoy benefits stemming from the portable mode and the non-portable mode.

Embodiments may be best understood by reference to the drawings. It will be readily understood that the components of the present disclosure, as generally described and illustrated in the drawings herein, could be arranged and designed in a wide variety of different configurations. Thus, the following more detailed description of the embodiments of the systems, methods and apparatuses is not intended to limit the scope of the disclosure, but is merely representative of possible embodiments of the disclosure. In some cases, well-known structures, materials, or operations are not shown or described in detail.

FIG. 1 illustrates a perspective view of a display and docking apparatus 100, according to an embodiment. The display and docking apparatus 100 may include a PED assembly 102 and a docking stand assembly 108. The PED assembly 102 may include a tablet 104 and a case 106. The tablet 104 may be encased in the case 106, with the case 106 having one or more apertures allowing for direct physical access to the tablet 104 for one or more of a screen, a button, a camera, a speaker, a microphone, a power receptacle, an audio receptacle, a video receptacle, a data receptacle, or some other receptacle and/or device integrated into the tablet 104. The case 106 may further be configured such that when it is combined with the tablet 104 (or other PED) to create the PED assembly 102, the case 106 of the PED assembly 102 can removably attach to the docking stand assembly 108.

That the PED assembly 102 uses the tablet 104 is given by way of example and not by limitation. The PED assembly 102 may instead comprise a smartphone, a portable PC, or any other PED that has been coupled with an appropriate case.

The docking stand assembly 108 may include a docking tray 110, a base 112, and a hinge 114 between the docking tray 110 and the base 112. The docking tray 110 may removably hold the PED assembly 102 by interfacing with the case 106. The docking tray 110 holds the PED assembly 102 in a position to enable a display side of the PED to be viewed. The PED assembly 102 may removably slide into the docking tray 110 portion of the docking stand assembly 108, or it may removably snap into the docking tray 110 of the docking stand assembly 108, or it may otherwise be attached to the docking tray 110 of the docking stand assembly 108. While not shown, it is contemplated that the docking stand assembly 108 may further include/attach to a keyboard, a mouse, a magnetic card reader, a wireless card reader, or other device. This keyboard (or other device) may be, e.g., integrated into or attached to the docking tray 110.

The docking tray 110 may be adapted to accept more than one type of PED. For example, the docking tray 110 may accept a large tablet (e.g., an iPad) without modification. However, it may be desirable to use another type of PED with the same docking stand assembly 108. To that end, inserts may be provided for use with the docking tray 110 that may change the effective size of the docking tray 110 such that it will instead properly fit, e.g., an iPad Mini, an smartphone running the Android operating system, or another PED. These inserts may be shaped to allow this other PED/PED assembly to connect to the features of the docking tray 110 (including cable interfaces) as those features are described herein when used with the docking tray 110. Alternatively to inserts for the docking tray 110, inserts may instead be used with the case 106 of the PED assembly to the same end.

The base 112 may be shaped and weighted in such a way to prevent the display apparatus 100 from sliding or tipping when, e.g., a user interacts (without using excessive force) with a touch screen of the tablet 104 of the PED assembly 102 when the PED assembly 102 is held by the docking tray 110. The base 112 may by shaped as, e.g., a circular cylinder (whether right or oblique), an, elliptic cylinder (whether right or oblique), a prism (whether right or oblique), a pyramid, or any other feasible shape, with at least one planar face on at the bottom of the base (so that the base may be placed on, e.g., a countertop).

In some cases, an elliptic cylinder shape (with inherent major and minor axes along the elliptic face at the top and bottom of a base) may be used instead of, e.g., a circular cylinder shape having axes the same length of the minor axis of the elliptic cylinder shape. The additional footprint and mass added to this base corresponding to the major axis of the elliptic cylinder may provide more stability to the base (particularly against forces along the major axis) as compared to the result of using the described circular cylinder as a base shape, while maintaining e.g., the width of the base along the minor axis to be the same at that of the base shaped as the described circular cylinder. Persons with ordinary skill in the art will recognize that analogous considerations may apply as between any two potential base shapes.

The base 112 of the docking stand assembly 108 may support the docking tray 110 holding the PED assembly 102 at a certain point in space through a hinge 114. The hinge 114 may hold the PED assembly 102 at the certain point when a user interacting with, e.g., a touch screen of the tablet 104 using only the limited force on screen of the tablet 104 that is necessary to register an input on the touch screen. The hinge 114 may also be configured such that a stronger force on the PED assembly 102 rotates the PED assembly 102 around the travel of the hinge 114. A hinge may selected such that is can appropriately support a PED/PED assembly of any size, shape, and/or mass that may be used with the docking stand assembly 108.

A first interface 116 may be disposed at or near the bottom of the base 112 of the docking stand assembly 108. The first interface 116 may be attached to a cable 118 that travels from the first interface 116 at the base 112 of the docking stand assembly 108 up through the docking stand assembly 108. In some embodiments, the cable 118 exits the docking stand assembly 108 near the docking tray 110 such that a user can conveniently find and connect a second interface 120 attached to the cable 118 to a receptacle or port on the tablet 104 (or other PED). This convenience may be due to a fixed position of the cable 118 and relative proximity to the PED assembly 102 as it leaves the docking stand assembly 108.

In some cases, the second interface 120 which is attached to the cable 118 may be integrated into the docking tray 110. The positioning of the second interface 120 in the docking tray 110 may be such that when the PED assembly 102 is slid (or otherwise attached) to the docking tray 110, the second interface 120 automatically connects with an appropriate receptacle on the tablet 104 (or other PED) of the PED assembly. In these cases, rather than exiting the docking stand assembly 108 near the docking tray 110, the cable 118 may continue to travel internally through the hinge 114 and/or internally through the docking tray 110 of the docking stand assembly 108 and connect to the second interface 120 from the inside of the docking tray. This method may be used in cases where, e.g., the docking tray 110 of the docking stand assembly 108 covers the interface receptacle of the tablet 104 when the PED assembly 102 is placed in the docking tray 110. In this case, the cable 118 may also connect internally to a device (such as a keyboard) that is integrated or otherwise attached to the docking tray 110.

The first interface 116, the second interface 120, and the cable 118 between them may enable the transport of a wide variety of power and/or data signals to and/or from the base 112 of the docking stand assembly to the tablet 104 (or other PED) of the PED assembly 102 (and/or any devices attached to or integrated into the docking tray 110). For example, the first interface 116 and the second interface 120 may be USB-C interfaces that communicate both power and data signals, and cable 118 may be a USB-C cable that transports the power and data signals. Alternatively, the first interface 116 may be a video interface (e.g., High-Definition Multimedia Interface (HDMI) or DisplayPort) that communicates video signals data to and/or from the second interface 120 to the first interface 116. Either of the first interface 116 and/or the second interface 120 may, in some embodiments, be a proprietary interface specially designed to provide power and/or communications signals to and/or from the tablet 104 of the PED assembly 102. First interface 116, second interface 120, and cable 118 may further provide for the physical transport of network communications between the tablet 104 (or other PED) of the PED assembly 102 and one or more external devices connected to the first interface 116. The first interface 116 may couple to an exterior cable 122 for power and/or data communication.

The base 112 of the docking stand assembly 108 may include a pivoting portion that rotates around an axis extending in an upward direction from at or near the center of the base 112. The hinge 114 supporting the docking tray 110 of the docking stand assembly 108 may be attached to this pivoting portion. This may allow a user to rotate a portion of the docking stand assembly 108 comprising both the hinge 114 and the docking tray 110 (and also any PED assembly 102 attached to the docking tray 110 of the docking stand assembly 108) about the axis.

The base 112 of the docking stand assembly 108 may include one or more of an LED, a button, ornamentation (such as a light or a colored ring), or any other item.

FIGS. 2A-2F illustrate various views of a PED assembly 200 of a display and docking apparatus, according to various embodiments. The PED assembly 200 may include a tablet 202 and a case 204. The case 204 may include any of the features of the case 106 and visa versa. The case 204 may incorporate various apertures allowing for immediate physical access to a receptacle or other device integrated into the tablet 202, for example, a screen aperture 206 for a tablet display, a camera aperture 208 for a camera 210, a power/data aperture 214 for a power/data interface, and an audio aperture 218 for an audio interface. Other apertures for, e.g., a button, a speaker, a microphone, a power receptacle, an audio receptacle, a video receptacle, a data receptacle, or some other receptacle are contemplated.

The PED assembly 200 may also hold, e.g., a stylus 220 at the side of the PED assembly 200 in a removable fashion. The stylus 220 may be held in place using a clamp mechanism 222 included in the case of the PED assembly 200, or in another way (e.g., via a magnet in either or both of the case or the tablet of the PED assembly 200).

The PED assembly 200 may incorporate other features. For example, the case of the PED assembly 200 may incorporate a handle 224 which allows the PED assembly 200 to be securely held and moved when it is not docked in a tray of a docking stand assembly. The handle 224 may optionally extend outward from the case of the PED assembly 200 in a manner such that a user using the PED assembly 200 when it is not attached to a docking stand assembly can slide part of a hand under the handle 224 in order to keep the PED assembly 200 secure while moving it about. This handle may further optionally collapse into the case 204 of the PED assembly 200 such that it sits flush with, or even within, the case 204 of the PED assembly 200. Collapsing the handle 224 in this fashion may permit the PED assembly 200 to fit properly within, e.g., a docking tray of a docking stand assembly.

Figure 3:
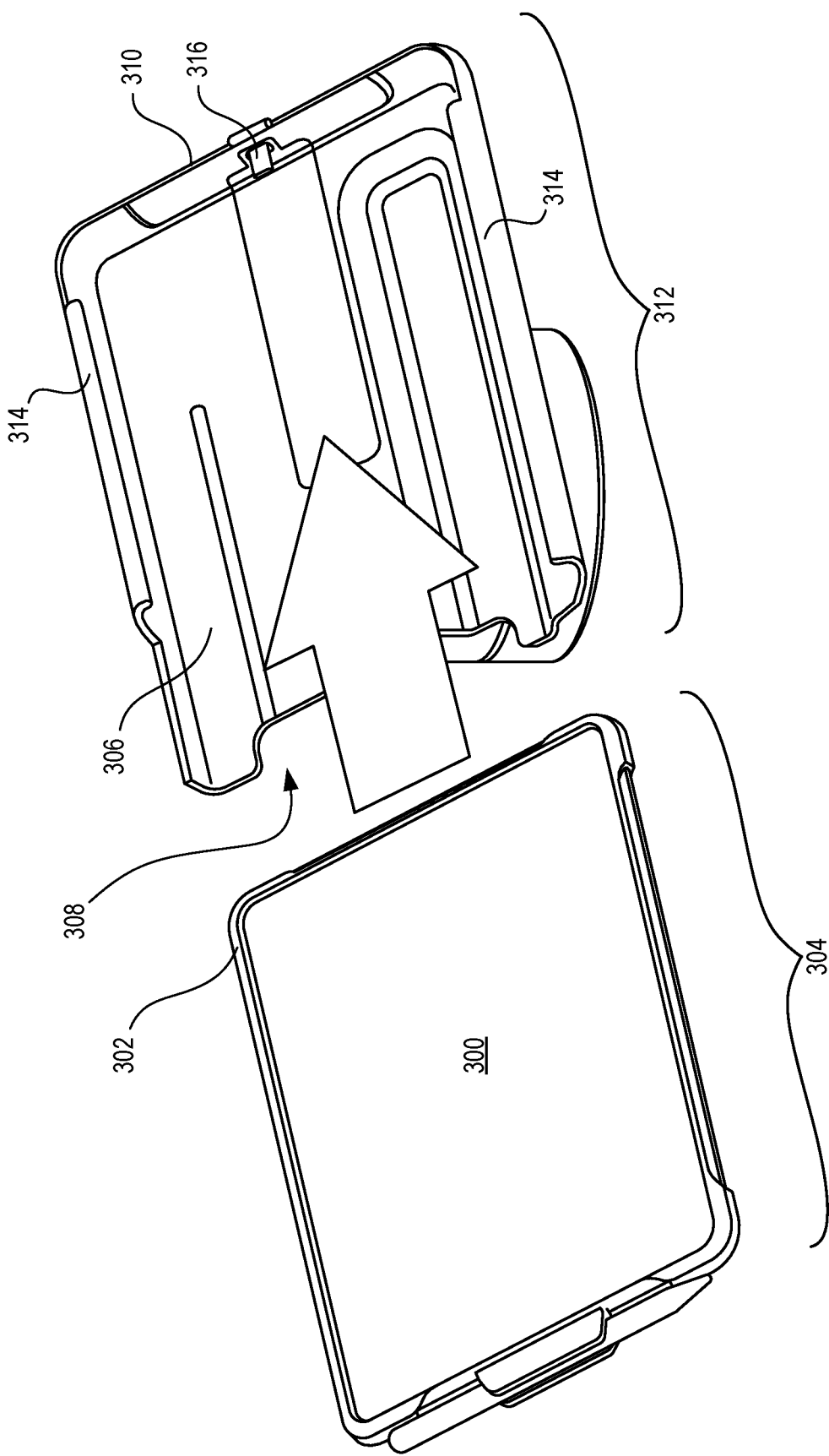
FIG. 3 illustrates a PED assembly sliding into a docking tray of a docking stand assembly of a display apparatus, according to an embodiment.
Figure 4A:
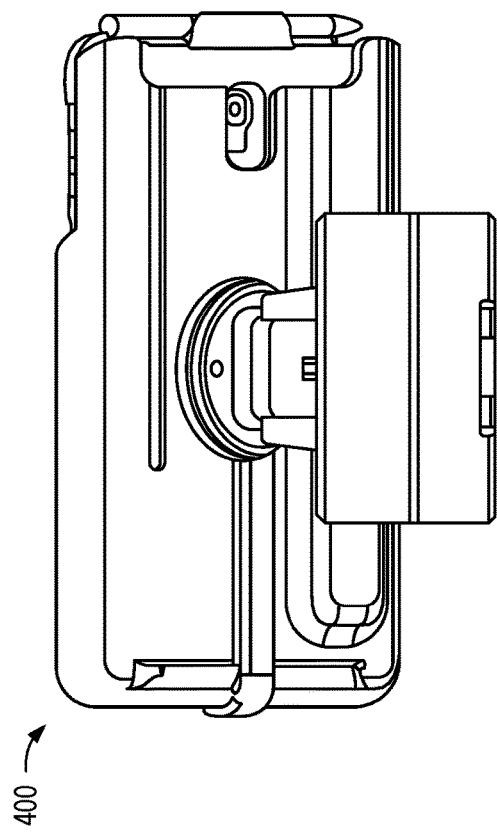
FIGS. 4A-4D illustrate various perspective views of a display and docking apparatus, according to various embodiments.
Figure 4B:
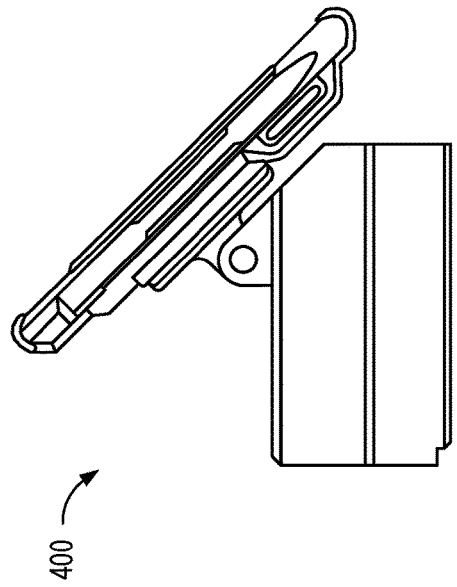
Figure 4C:
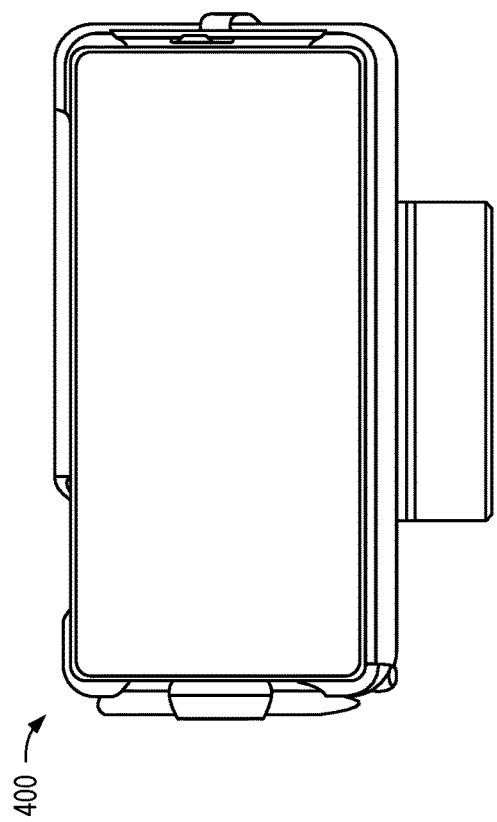
Figure 4D:
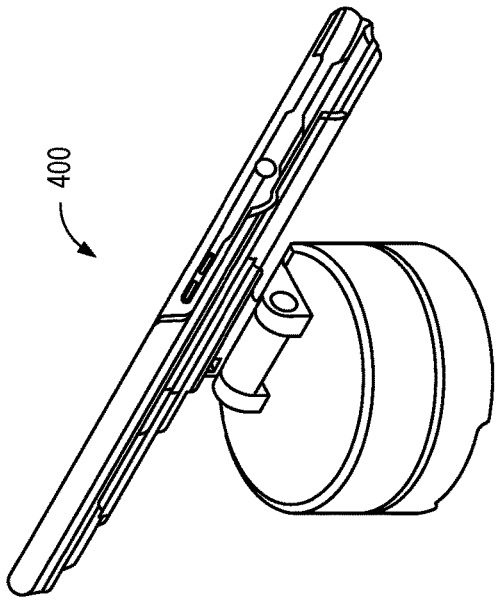

FIG. 3 illustrates an embodiment of a PED 300 and case 302, collectively referred to herein as a PED assembly 304. The case 302 at least partially encases the PED 300 and the case 302 may include one or more apertures to enable access to the PED 300. A docking tray 306 may include an open end 308, to receive the PED assembly 304, and a closed end 310 to limit movement and retain the PED assembly 304. As illustrated, the PED assembly 304 slides into and removably attaches to the docking tray 306 of the docking stand assembly 312.

The docking tray 306 may include one or more rails 314 that are configured to hold the case 302 (and thus the entire PED assembly 304) in place. The rails 314 may be disposed on at least a portion of the perimeter of the docking tray 306. In order to later remove the PED assembly 304, the PED assembly 304 may slide in an opposite direction and out of the rails 314. One or more features in the case 302 of the PED assembly 304 may be specially designed to interface with the rails 314 in such a way the PED assembly 304 is very unlikely to slide out of the docking tray 306 without the user intending such a result. For example, the case 302 may have one or more divots into which one or more rails 314 settle when the PED assembly 304 is slid into the docking tray 306. The case 302 and the docking tray 306 may, in some cases, securely interlock together in such a way that a key or other device is needed to release the case 302 (and thus the entire PED assembly 304) from the docking tray 306.

Methods for removably attaching the PED assembly 304 to the docking tray 306 of the docking stand assembly 312 are not limited to using rails 314. For example, the docking tray 306 may include one or more tab mechanisms (not shown) to removably snap over one or more edges of the case 302 of the PED assembly 304 in order to hold the PED assembly 304 in place in the docking tray 306. The tabs could then be pulled away from the face of the PED assembly 304 in order to remove the PED assembly 304 from the docking tray 306 of the docking stand assembly 312. One or more features in the case 302 of the PED assembly 304 may be specially designed to interface with the tabs of the docking tray 306 in such a way the PED assembly 304 is very unlikely to fall out of the docking tray 306 without the user intending such a result. For example, the case 302 may have one or more divots into which one or more tabs settle when the PED assembly 304 slides into the docking tray 306.

Still other embodiments may use one or more magnets in the case 302 of the PED assembly 304 and the docking tray 306 in order to hold the PED assembly 304 in place against the docking tray 306.

In some embodiments, a separate latching mechanism (not shown) or other mechanism may act to secure the case 302 of the PED assembly 304 with the docking tray 306 once the PED assembly 304 has otherwise been attached to the docking tray 306 according to embodiments herein. It may then be necessary to release the separate latching mechanism in order to, e.g., slide the PED assembly 304 out and away from the docking tray 306. The latching mechanism may be integrated into the case 302 of the PED assembly 304 or the docking tray 306, or components of the latching mechanism may be integrated into each of the case 302 of the PED assembly 304 and the docking tray 306.

In some embodiments, a portion of docking tray 306 may cover the power/data (or other) receptacle of the tablet of the PED apparatus when the PED apparatus is slid into (or otherwise attached to) the docking tray 306 of the docking stand assembly 312. The docking tray 306 may include an interface or port 316 that removably couples with a power/data (or other) receptacle of the PED 300. The docking tray 306 may be sized and configured so that the PED 300 lines up specifically with the interface 316 to enable coupling and thereby enabling data and power communication. The integration of interface 316 into docking tray 306 may be consistent with the discussion of other figures herein. The interface 316 enables power and data communication between the tablet and the docking components and disclosed herein. Accordingly, the interface 316 may be in electrical communication with a cable (not shown) which may extend through or proximate to the docking tray 306.

It is further contemplated that the docking tray 306 may be designed for use as described herein with an uncased PED (rather than the full PED assembly 304).

FIGS. 4A-4D illustrate various views of a display and docking apparatus 400, according to the embodiment of FIG. 1. The embodiments of FIG. 4 may be consistent with the disclosure herein.

FIGS. 5A-5C illustrate a plurality of pivots that are possible with various respective embodiments of a display and docking apparatus 500. With reference to FIGS. 5A and 5B, a first pivot or rotation 502 may be possible between a docking tray 504 and base 506 along a hinge 508. The first pivot may allow a user to adjust the viewing angle of a PED assembly that may be optionally attached to the docking tray 504 in a vertical direction.

The allowed range of rotation of the first pivot 502 may be as large as physically possible (e.g., a range of rotation around 270 or more degrees, where the range is restrained at the ends only by nature of the docking tray 504 interaction with the base 506 of the docking stand assembly). In other embodiments, the allowed range of rotation of the first pivot 502 may instead be around 20 or 30 degrees. A smaller range of motion may be caused by the physical characteristics of the hinge 508.

A second pivot or rotation 510 may be possible about the base 506 of a docking stand assembly. The base 506 of a docking stand assembly may include a pivoting portion 512 and a static portion 514. In some embodiments, the hinge 508 (and thus the docking tray 504) are attached to the pivoting portion 512, and an interface 516 is integrated into the static portion 514. The interface or port 516 enables power and data communication for a tablet. Thus, a rotation along the second pivot 510 may cause the hinge 508 (and thus the docking tray 504) to rotate in a horizontal direction, while any attachment to the interface 516 remains unmoved. In this way, the user may adjust the viewing angle of a PED assembly that may be optionally attached to the docking tray 504 in the horizontal direction without interfering with, e.g., a cable 518 or other item attached to the interface 516. This rotation may provide for, e.g., the adjustment of the view of the front of the PED assembly between two users located on opposite sides of a surface upon which the display and docking apparatus 500 is placed.

The allowed range of rotation of the second pivot 510 may be as large as physically possible (e.g., a range of rotation of 360 or more degrees, or an unrestrained range of rotation). In other embodiments, the allowed range of rotation of the second pivot 510 may instead be around 350 degrees. In still other embodiments, the range of rotation about the second pivot may be around 10 or 30 degrees. The range of rotation may be caused by the physical characteristics of the interaction between the pivoting portion 512 and the static portion 514 of the base 506.

Figure 6:
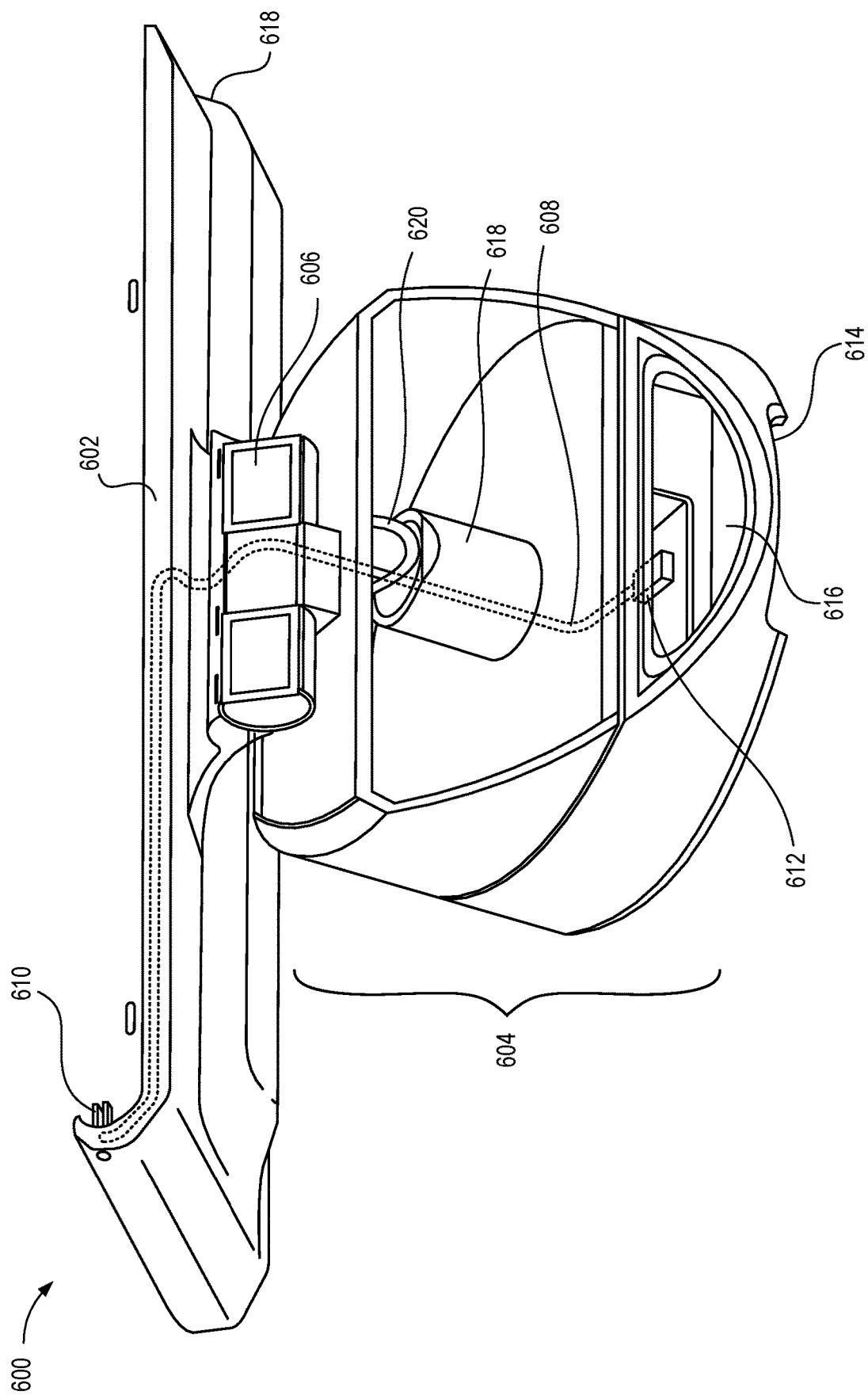
FIG. 6 illustrates a docking stand assembly of a display and docking apparatus that includes a cable that has been routed through the docking stand assembly, according to an embodiment.

FIG. 6 illustrates a display and docking stand assembly 600 that includes a docking tray 602 that attaches to a base 604 by means of a hinge 606. The docking stand assembly 600 may include a cable 608 that routes through the docking stand assembly 600, according to an embodiment. The cable 608 is attached to and electrically communicates with a first interface or port 610 and a second interface or port 612 to enable data and power communication. The first interface 610 removably attaches to a PED when the PED is inserted into the docking tray 602.

The first interface 610, the second interface 612, and the cable 608 between may enable the transport of a wide variety of power and/or data signals to and/or from a base of the docking stand assembly to a tablet (or other PED) of a PED assembly (not shown) attached to the docking stand assembly 600. For example, the first interface 610 and the second interface 612 may be USB-C interfaces that communicate both power and data signals, and cable 608 may be a USB-C cable that transports the power and data signals. Alternatively, the first interface 610 may be a video interface (e.g., HDMI or DisplayPort) that communicates video signal data to and/or from the second interface 612 to the first interface 610. Either of the first interface 610 and/or the second interface 612 may, in some embodiments, be a proprietary interface specially designed to provide power and/or communications signals to and/or from a tablet of a PED assembly. First interface 610, second interface 612, and cable 608 may provide for the physical transport layer of network communications between a tablet (or other PED) of a PED assembly that is attached to a docking tray 602 of a docking stand assembly 600 and one or more external devices connected to the first interface 610.

In some embodiments, the base 604 of the docking stand assembly 600 may include a notch 614 or other design feature allowing cabling to pass from outside the docking stand assembly 600 into the docking stand assembly 600 while simultaneously allowing the base 604 of the docking stand assembly 600 to sit flat on a surface. In some embodiments, the second interface 612 may be set inside of a hollow area 616 of a base 604 of the docking stand assembly 600 contiguous with the notch 614. The cable 608 may begin at the first interface 610 and pass through the center of one or more rotor components 618, 620 and the center of a hinge 606 of the docking stand assembly 600 such that when one or more of the rotor components 618, 620 (and thus hinge 606) rotate (e.g., to allow for the second pivot 510 described in relation to FIGS. 5A-5C) the routing path of the cable 608 through the docking stand assembly 600 is not disturbed.

The cable 608 may be routed internally to the docking tray 602 of the docking stand assembly 600 in order to reduce external cabling and simplify use. In some embodiments of a docking stand assembly 600, the first interface 610 is integrated into the docking tray 602. In these cases, the positioning of the first interface 610 in the docking tray 602 may be such that when a PED assembly is slid (or otherwise attached) into the docking tray 602, the first interface 610 automatically connects with an appropriate receptacle on a tablet (or other PED) of the PED assembly. The routing of the cable 608 internally to the docking tray 602 may thus allow the cable to properly connect to an integrated first interface 610.

Figure 7:
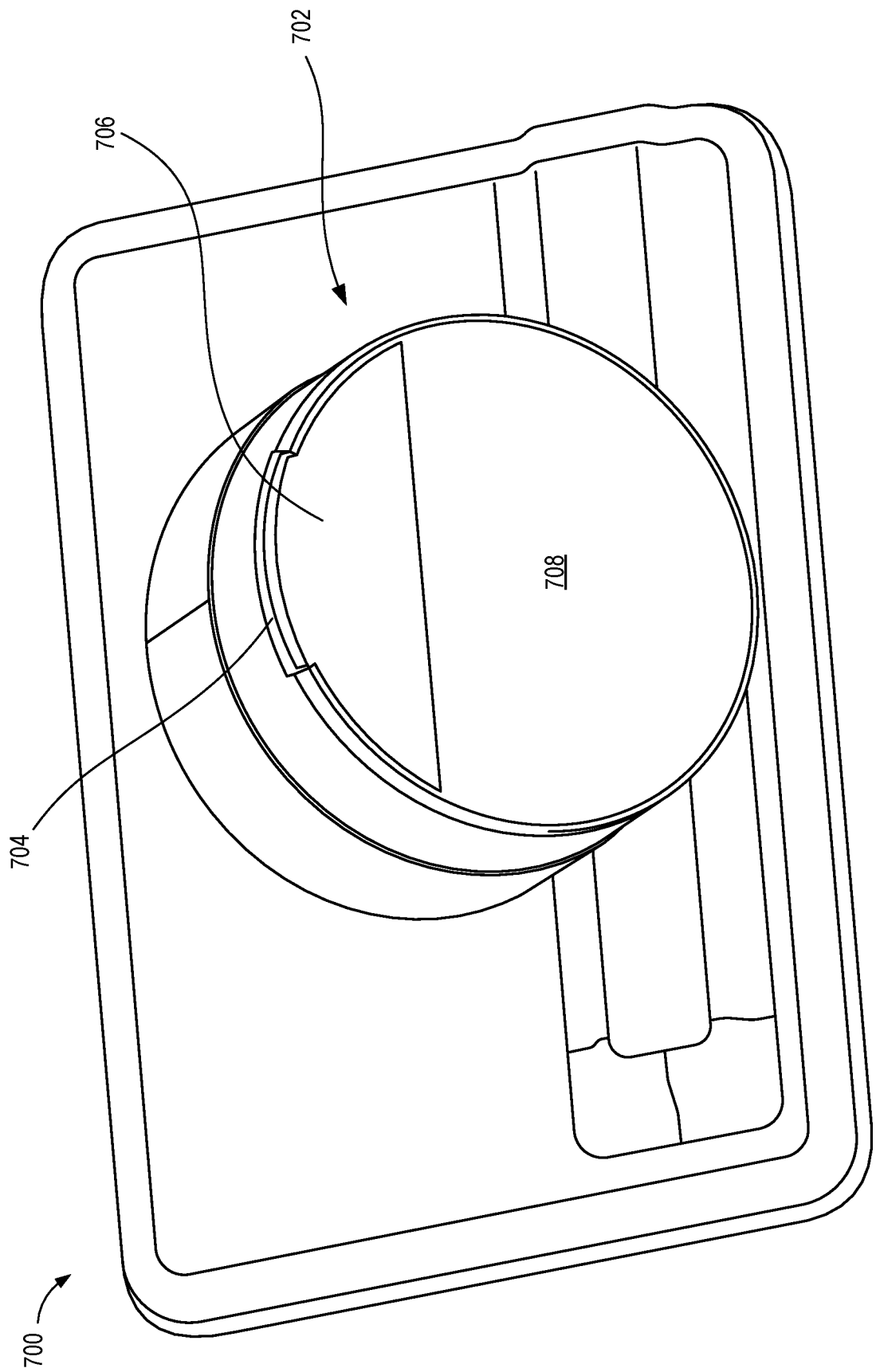
FIG. 7 illustrates a docking stand assembly of a display and docking apparatus, according to an embodiment that includes a notch and a hollow cavity, according to an embodiment.

FIG. 7 illustrates a docking stand assembly 700 of a display and docking apparatus, according to an embodiment. The base 702 of the docking stand assembly 700 may include a notch 704 and a hollow cavity 706, according to an embodiment. The notch 704 and the hollow cavity 706 are contiguously arranged such that a cable passing through the notch 704 and into the hollow cavity 706 does not interfere with the ability of a bottom 708 of the base 702 of the docking stand assembly 700 to flatly sit on a surface.

FIG. 8 illustrates the construction of a modular base 802 of a display and docking stand assembly 800, according to an embodiment. Any base disclosed in any of the embodiments herein may be the modular base 802, or a similar embodiment. The modular base 802 may comprise one or more separate modules 804-818 assembled together to form the entirety of the modular base 802. One or more of the modules 804-818 may be removably assembled together in a manner of "stacked brick" and/or one or more of the modules 804-818 may be integrally secured to one another.

The modules 804-818 may each perform one or more of any number of functions. The modules 804-818 may each connect to, e.g., a cable running through the docking stand assembly that includes the modular base 802 The connection to this cable may allow each module 804-818 of the modular base 802, as necessary, to connect to and communicate with a PED of the display apparatus that is attached to the cable of the docking stand assembly (e.g., a PED that is attached to an interface attached to the cable and optionally integrated into a docking tray of the docking stand assembly, in the manner discussed in embodiments herein). A connection to the cable may also allow each module 804-818 to connect to and send network or other communications to one or more external devices connected to an interface of the cable (e.g., an interface available at the bottom of the modular base 802, similar to embodiments discussed herein, particularly FIG. 6). This cable may also provide power to one or more of the modules 804-818. The modules 804-818 (and any other modules) comprising the modular base 802 may allow for the cable to pass through their respective centers.

Each module 804-818 may be shaped such that the combination of modules 804-818 into the modular base 802 creates a single shape, along the lines of possible base shapes as those base shapes have already been discussed herein.

A docking tray support module 804 may be placed at the top of the modular base 802 and may attach the modular base 802 to a hinge and a docking tray of the completed docking stand assembly, similar to embodiments already discussed herein.

A connectivity module 806 may incorporate components that allow the components of the display apparatus that includes the modular base 802 to connect and transfer data to one or more external devices. These external devices may be audiovisual devices, network devices, storage devices, or any other device. For example, the connectivity module 806 may incorporate USB-A and/or USB-C ports for data transfer to an external device (or, in the case of, e.g., a DisplayLink-enabled external device, audio and or video data transfer to an external device), HDMI/DisplayPort ports for audio and/or video transfer to an external device, a 3.5 mm port for audio transfer to an external device, or any other similar port. Devices attached to these ports may communicate with the other modules 804-818 of the modular base 802 of a docking stand assembly and/or a PED attached to a docking tray of a docking stand assembly of the display apparatus via the cable that runs through the docking stand assembly and connects to the PED and/or any of the modules 804-818. This may allow, e.g., the PED of the display apparatus to provide audio data to a speaker attached to the 3.5 mm port, or video data to a computer monitor attached to the DisplayPort port. Another of the modules 804-818 may also utilize one or more of these ports in this way.

The connectivity module 806 may incorporate components that allow the modular base 802 to be connected to one or more external networks or devices. It may include components that allow the modular base 802 to connect to, e.g., a Wi-Fi, cellular, or other wireless network. This network connection may be made available to the other components of the display apparatus using, e.g., the cable that passes through the docking tray, hinge, and modular base 802 of the docking stand assembly of the display apparatus. This wireless network connection may provide the PED and/or the modules 804-818 of the of the display apparatus with access to networked communications when the cable of the docking stand assembly is not otherwise physically connected to any external network devices in the manner described relative to other embodiments herein. The connectivity module 806 may include network hardware interfaces (other than an interface of the cable passing through the docking stand assembly as already discussed herein) for use by the display apparatus via the connection of the connectivity module 806 to the cable. These interfaces may similarly provide the PED and/or the modules 804-818 of the of the display apparatus with access to networked communications when the cable of the docking stand assembly is not otherwise physically connected to any external network devices in the manner described relative to other embodiments herein. These interfaces may include, e.g., an Ethernet interface and/or a USB interface. Alternatively, some or all of these physical interfaces may be included in a separate module. These network interfaces (whether physical or wireless) may be used for things other than or in addition to network communication (e.g., used transfer a DisplayLink signal from a PED of the display apparatus to a DisplayLink-enabled external device).

A physical security module 808 may contain a steel eye or other physical interface to which a security device or computer lock, e.g., a chain or a cable, may be attached. This chain or cable may then be secured to a counter (or other stationary object) which is near the docking stand assembly of a display apparatus. This may add some level of locational security to the docking stand assembly.

A power module 810 may include, e.g., a battery capable of providing power to the other modules 804-808 and 812-818 of the modular base 802 of the docking stand assembly and/or the PED of a PED apparatus that is attached to the docking tray of the docking stand assembly. The transport of this power may be accomplished using, e.g., the cable that passes through the docking tray, hinge, and modular base 802 of the docking stand assembly.

An indicator module 812 may be capable of receiving information sourced from the other modules 804-810 and 814-818 of the modular base 802 and/or a PED attached to a docking stand assembly that includes the modular base 802. The indicator module 812 may include one or more user outputs that are capable of displaying lights, text, graphics, or other outputs corresponding to the current status of one or more of the modules 804-810 and 814-818 (and/or the PED) as indicated in the received information. For example, a power indicator light on the indicator module 812 may change colors, which may indicate to a user that the power module 810 is charged (e.g., lit up green), is running low on power (e.g., lit up yellow/amber), or may be out of power (e.g., lit up red). A network indicator light on the indicator module 812 may light up, e.g., blue, to indicate that a network connection is detected at the indicator module 812. As another example, a text output screen on the indicator module 812 may indicate, e.g., the name of a network to which the connectivity module 806 is connected, and a graphic output screen may display, e.g., a graphic indicating a corresponding signal strength for that network. As another example, a light bar on the indicator module 812 may light up a certain color when the PED indicates that a transaction was successful.

A payment module 814 may accept payment methods for processing on the PED of a PED apparatus attached to the docking tray of a docking stand assembly that includes the modular base 802. To perform this processing function, it may be necessary for the PED to communicate with an external payment processing device. This communication may occur over a network connection provided on an interface of the cable passing through the docking stand apparatus and/or on a network connection provided to the display apparatus through the connectivity module 806 of the modular base 802 of the docking stand apparatus. Payment methods that may be accepted via the payment module 814 may include, but are not limited to, a credit card or debit card using a magnetic strip (using, e.g., a strip reader incorporated into the payment module 814), a credit card or debit card using a chip reader (using, e.g., a chip reader incorporated into the payment module 814), and/or a credit card or other device (such as a smartphone) using wireless payment methods (using, e.g., a near-field communications (NFC) reader incorporated into the payment module). Input buttons and display screens (such as those buttons and screens necessary for, e.g., a personal identification number (PIN) entry and/or ZIP code entry when using these or other methods of payment) may also be included in the payment module 814. Collectively, all forms of devices to read payment information are referenced herein as a payment input device.

A sound module 816 may be configured with speakers and may be connected to the cable passing through the docking stand apparatus that includes the modular base 802. Sounds generated by a PED of a display apparatus may travel along the cable of the docking stand apparatus to the sound module 816 and be reproduced on these speakers. This may allow for the sounds from the PED to be louder and/or clearer than they otherwise would have been using, e.g., the speakers of the PED itself. The speakers of the sound module 816 may also provide audio feedback from any of the other modules 804-814 and 818 to a user. These sounds, too, may be received over, e.g., the cable passing through the docking stand assembly that includes the modular base 802 and is connected to one or more of the modules 804-814 and 818 which are providing the sound. The sound module 816 may also amplify the volume of user speaking into a microphone (e.g., a microphone of a PED of the display apparatus or a microphone attached to the connectivity module 806).

A docking stand foundation module 818 may configured (e.g., via weight and/or shape, as already described herein) to support the entire display apparatus from sliding or tipping when, e.g., a user interacts (without using excessive force) with, e.g., a touch screen of a PED of the display apparatus. It may also provide a staging location for, e.g., the first interface 604 of the cable 602 of the docking stand assembly of the display apparatus, the notch 608, and the hollow area 610 as those elements were discussed in relation to FIG. 6. The docking stand foundation module 818 may include a steel eye or other physical interface to which a security device may be attached, as described in relation to the security module 808 discussed above. The docking stand foundation module 818 may include physical features used to interlock with a physical feature of the surface upon which the docking stand assembly that includes the modular base 802 may be placed. This may provide a way to further secure the docking stand assembly to the surface and may help prevent theft of one or more of the devices described herein. Once interlocked, a key or other device may be necessary to disengage the surface and the docking stand foundation module 818 from each other.

Any of the modules 804-818 may include physical features on the top (or the bottom) that allow them to interlock with physical features found on the bottom (or the top) another module 804-818. In this way, the modules 804-818 may be secured together in a tamper-proof way. Alternatively, an interlock module (not shown) may be used to accomplish the same purpose. The interlock module may include physical features on two sides, with each side's physical features designed to interlock with physical features on the top of one of the modules 804-818 and to physical features on the bottom of another of the modules 804-818. Once interlocked, a key or other device may be necessary to disengage any two of the described modules from each other.

Each module 804-818 of the modular base 802 of may optionally rotate around an axis extending upward from at or near the center of the modular base 802. As discussed herein, a base (e.g., the modular base 802) may be comprised of a pivoting portion and a static portion. The modules 804-818 may thus either rotate in the manner described or remain static (and thus accordingly be included in either the pivoting portion of the modular base 802 or the static portion of the modular base 802) based on the characteristics relative to each module 804-818. For example, the docking tray support module 804 and the payment module 814 may be included in the rotating portion of the modular base 802 in order to facilitate the use of devices/components attached to those modules 804, 814 by, e.g., two users located on opposite sides of a surface upon which the display apparatus is placed. This may be especially useful with, e.g., a PED apparatus attached to the docking tray and hinge attached to the docking tray support module 804, and/or the magnetic strip/chip/NFC reader(s) included in the payment module 814.

On the other hand, it may be more beneficial for, e.g., the physical security module 808 and the docking stand foundation module 818 to be included in a static portion of the modular base 802 so that any features of those modules 808, 818 that should optimally remain static in space (e.g., the first interface 604, the notch 608, and the hollow area 610 of FIG. 6 as they might be implemented in the docking stand foundation module 818, and/or a physical interface of the physical security module 808) are not rotated along with the pivoting portion of the base.

Any module 804-818 that is included in the pivoting portion of the modular base 802 may include rotor components (similar to the rotor components 612, 614 disclosed in relation to FIG. 6) that allow for the cable to pass up through and connect to each module of the pivoting portion without the rotation of the pivoting portion disturbing the routing path of the cable through the module. The modules comprising the pivoting portion of the modular base 802 and the modules comprising the static portion of the modular base 802 may be placed in any order, and may be interleaved as between each other.

Any of the modules comprising the modular base 802, including the modules 804-818, may be optionally added to or removed from the modular base 802. As such, the modules 804-818 may be interlockable through a connection that is universal for the various modules. This means that the modular base 802 can be configured with (and thus costs incurred for) only the modules that provide that functionality needed for a given use case. For example, in cases where a proper network connection can be provided to a display apparatus at an interface of the cable that runs through docking stand assembly of the display apparatus, it may not be necessary to include the connectivity module 806 (and the attendant wireless networking that the connectivity module 806 may enable). As another example, if it is known that reliable power can be provided at an interface of the cable that runs through the docking stand assembly of a display apparatus at the location that the display apparatus will be used, it may not be necessary to include the power module 810 in the modular base 802 of the docking stand assembly of the display apparatus. Modules (including any of the modules 804-818) may be added or removed from the modular base 802 of a particular display apparatus as the use case for that display apparatus changes and/or as new modules with new feature sets are developed and determined to be useful for the use case of that display apparatus.

Figure 9:
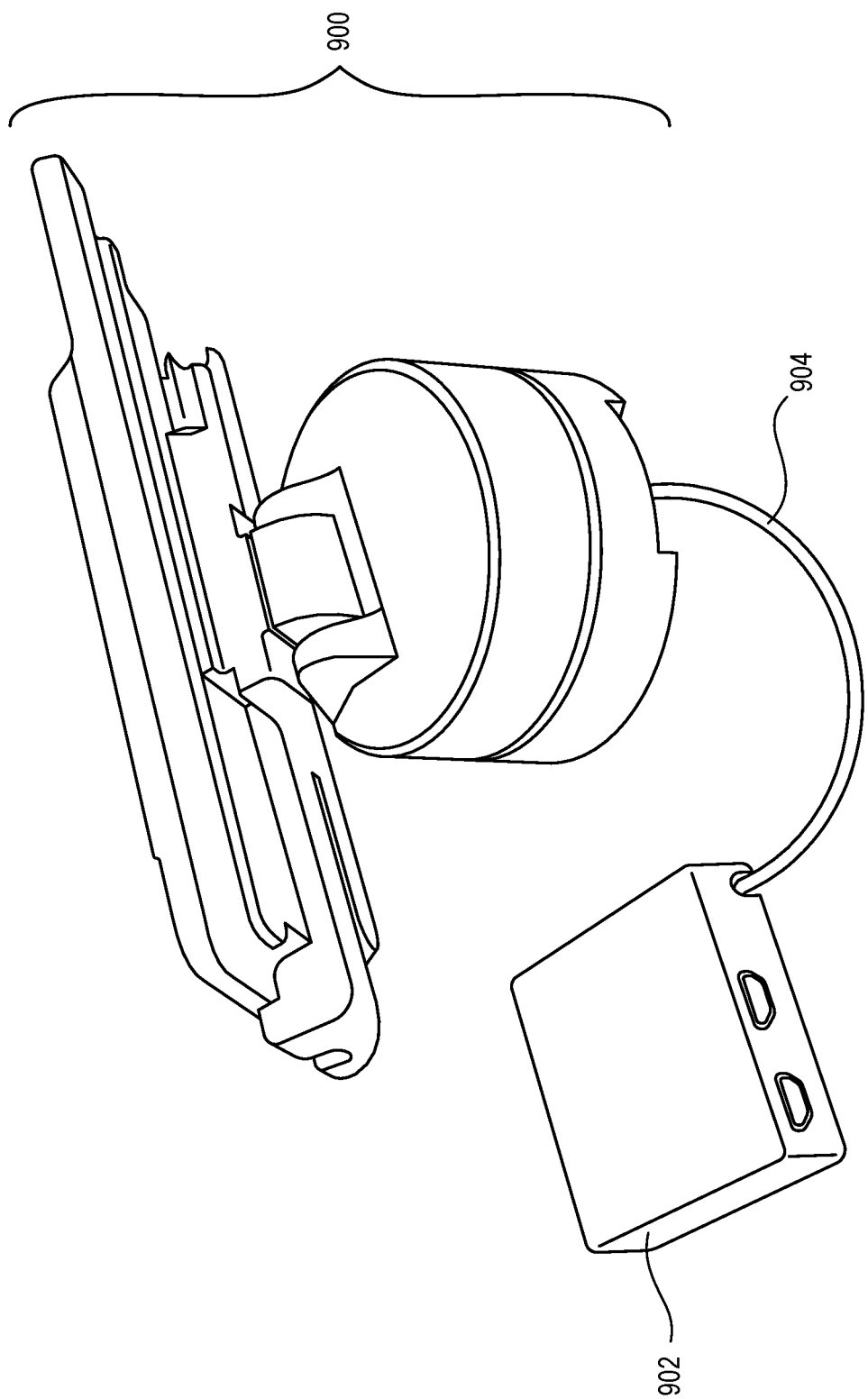
FIG. 9 illustrates an embodiment of a docking stand coupled to a docking station.

FIG. 9 illustrates an embodiment of a display and docking apparatus 900 that is in electrical communication with a docking station 902 via a cable 904. In this manner, the apparatus 900 receives data and power from a docking station 902 and the apparatus 900 may be in directional data communication with a network and one or more peripheral devices.

Figure 10:
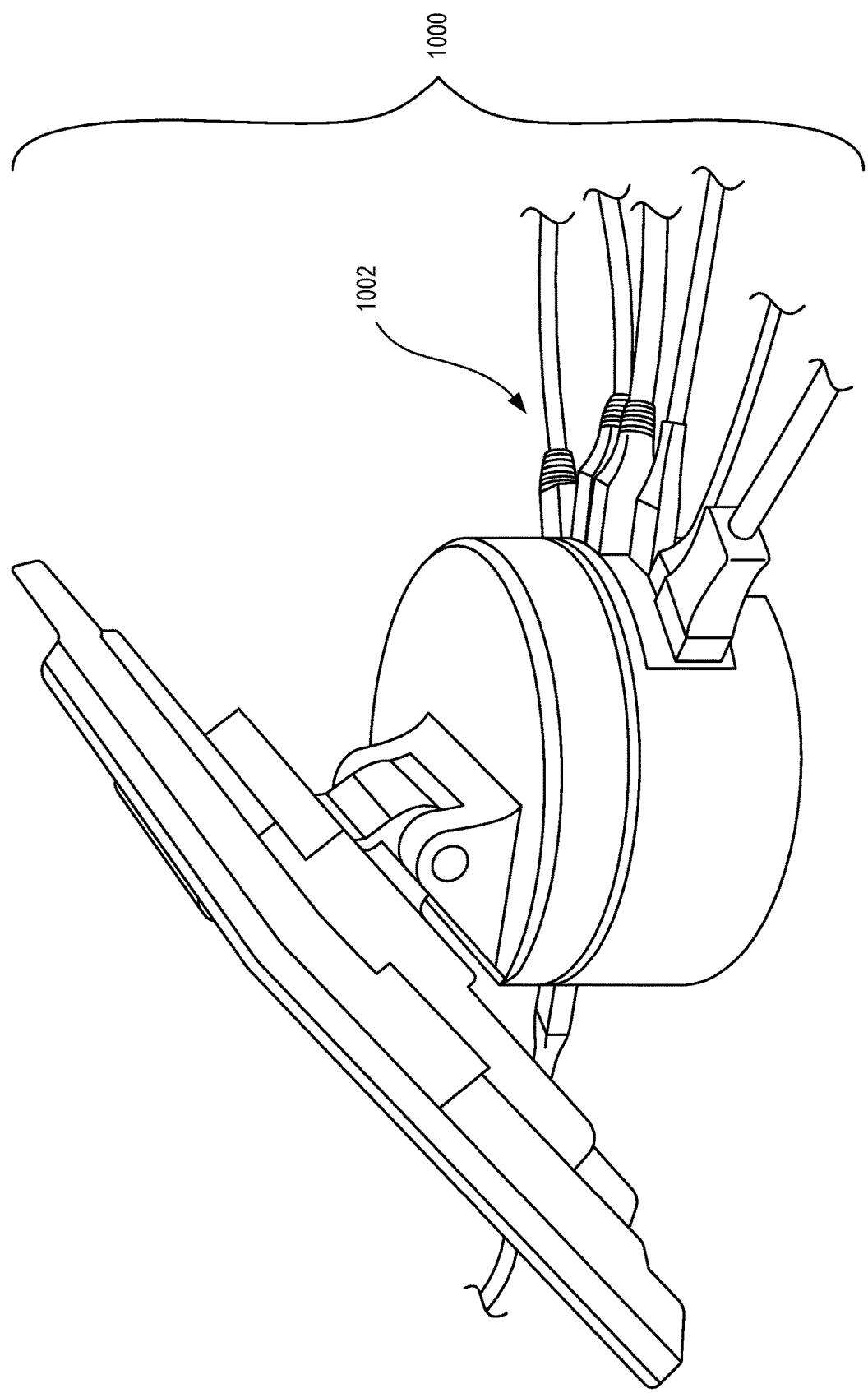
FIG. 10 illustrates an embodiment of a docking stand with a plurality of docking ports.

FIG. 10 illustrates an embodiment of a display and docking apparatus 1000 similar in function to that disclosed in FIG. 8. The display and docking apparatus includes multiple modules with one or more of the modules including an interface or port to enable power and/or data communication with a respective module. The modules may be described as being stacked upon one another to enhance the features and capability of the display and docking apparatus. The interfaces may be staggered to accommodate removable attachment of the cables 1002.

Figure 11:
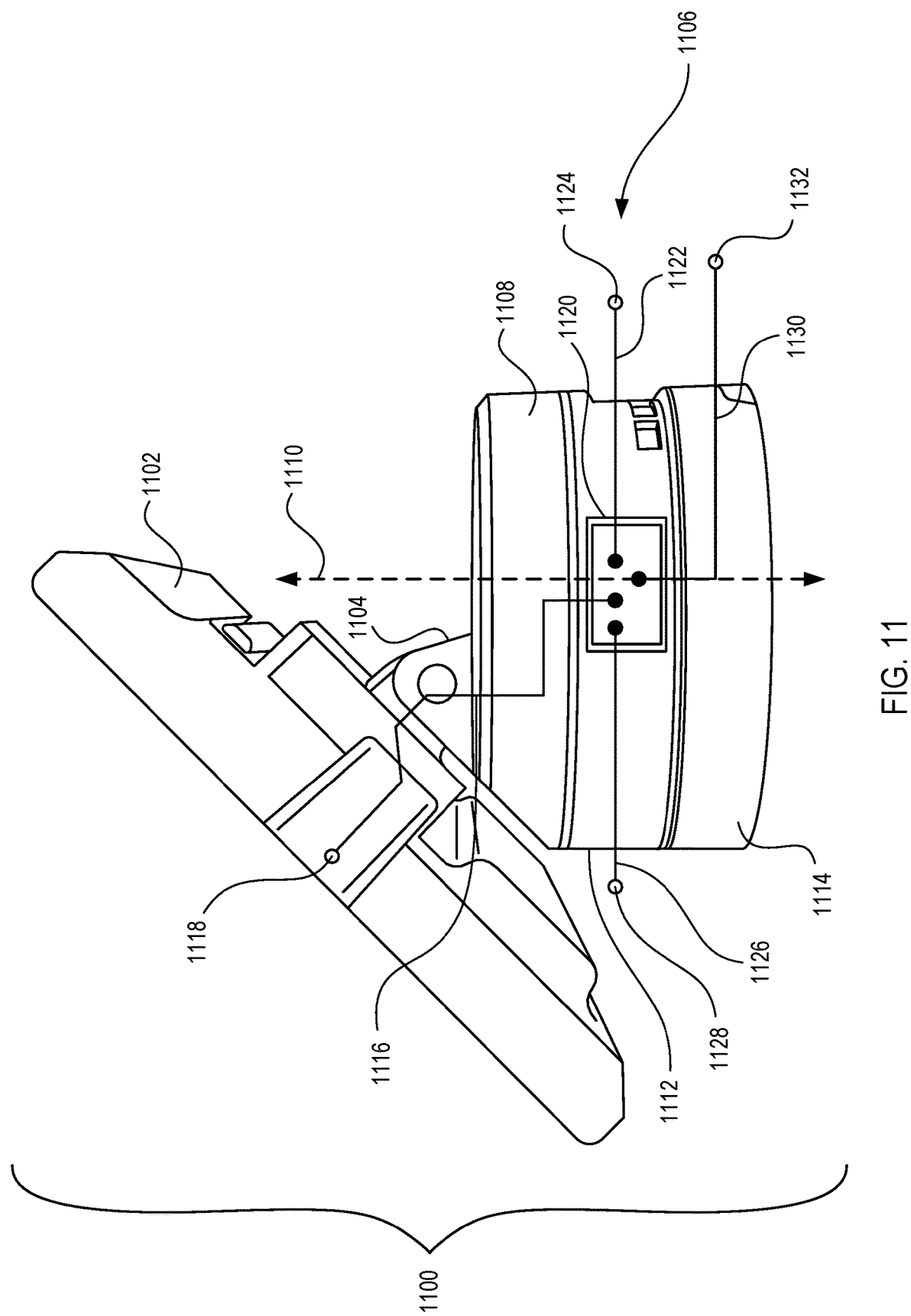
FIG. 11 illustrates an alternative embodiment of a display and docking apparatus.

FIG. 11 illustrates an embodiment of a display and docking apparatus 1100 with base modules and various wired paths. As in previous embodiments, the display and docking apparatus includes a docking tray 1102, a hinge 1104 pivotally coupled to the docking tray 1102, and a base 1106 coupled to the hinge 1104. As disclosed in referenced to FIG. 8, the base 1106 may include one or more modules to provide various functions for the display and docking apparatus. The base 1106 may include a docking tray support module 1108, which may also be referred to a pivoting or rotatable module, to enable rotation about a base axes 1110. The base 1106 may also include a connectivity module or docking module 1112 to enable power and data interface with devices external to the display and docking apparatus 1100. The base 1106 may further include a docking stand foundation module 1114 that may be weighted to maintain the vertical position of the display and docking apparatus 1100.

The display and docking apparatus 1100 may include a first wired path or internal cable 1116 that extends from a PED interface 1118 to an electronic junction 1120, e.g. such as a P.C. board, in the connectivity module 1112. In this manner, electrical communication between a PED and the electronic junction 1120 is enabled. The connectivity module 1112 may include a second wired path or internal cable 1122 that extends from the electronic junction 1120 to a first external port 1124. The connectivity module 1112 may include a third wired path or internal cable 1126 that extends from the electronic junction 1120 to a second external port 1128. The first and second external ports 1124, 1128 may be disposed in various locations on the base exterior as deemed convenient, including on opposing sides of the base 1106. As can be appreciated, the display and docking apparatus 1100 may include any number of wired paths and external ports to enable data and power communication with the portable electronic device.

The display and docking apparatus 1100 may include a fourth wired path or internal cable 1130 that extends from the electronic junction 1120 and through the docking stand foundation module. The fourth wired path 1130 may extend to a third external port 1132 to enable data and/or power communication with a peripheral device.

Referring to FIGS. 12A-12E, an alternative embodiment of a display and docking apparatus 1200 with base modules and wired paths. As in previous embodiments, the display and docking apparatus 1200 includes a docking tray 1202, a hinge 1204 pivotally coupled to the docking tray 1202, and a base 1206 coupled to the hinge 1204. The base 1206 may be rectangular in shape rather than the previously disclosed cylindrical embodiments.

The base 1206 may include a docking tray support module 1208, a connectivity module 1210, and a docking stand foundation module 1212. The modules 1208-1212 may be embodied as the modules previously disclosed. The docking tray support module 1208 may include a turn table 1214 (shown in FIGS. 12D and 12E) to enable rotation of the hinge 1204 and the docking tray 1202 relative to the base 1206. Further, the hinge 1204 may include an extended hinge base 1216 to elevate the docking tray 1202 from the base 1206 to prevent rotation obstruction between the docking tray 1202 and the base 1206.

Figure 12D:
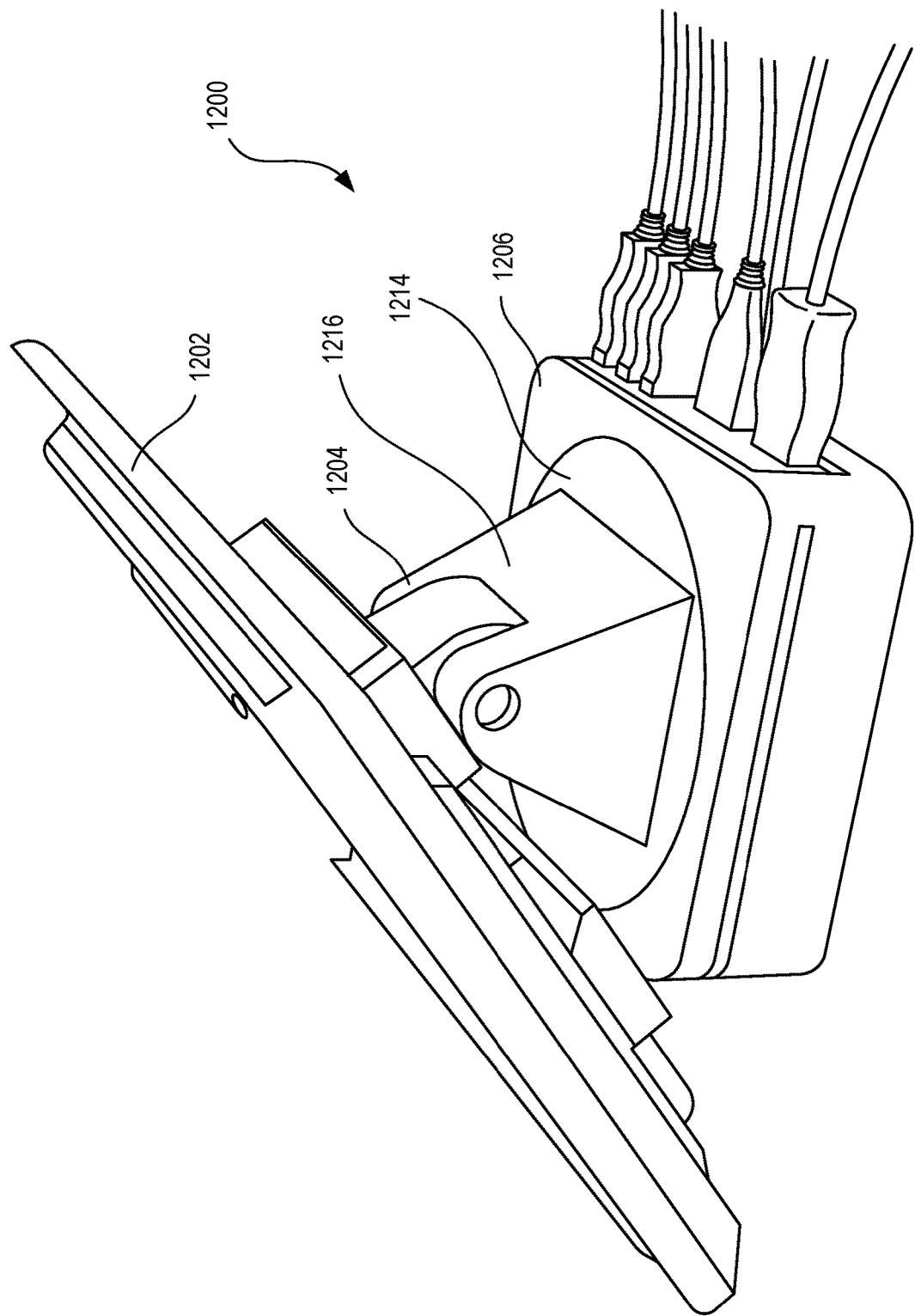
Figure 12E:
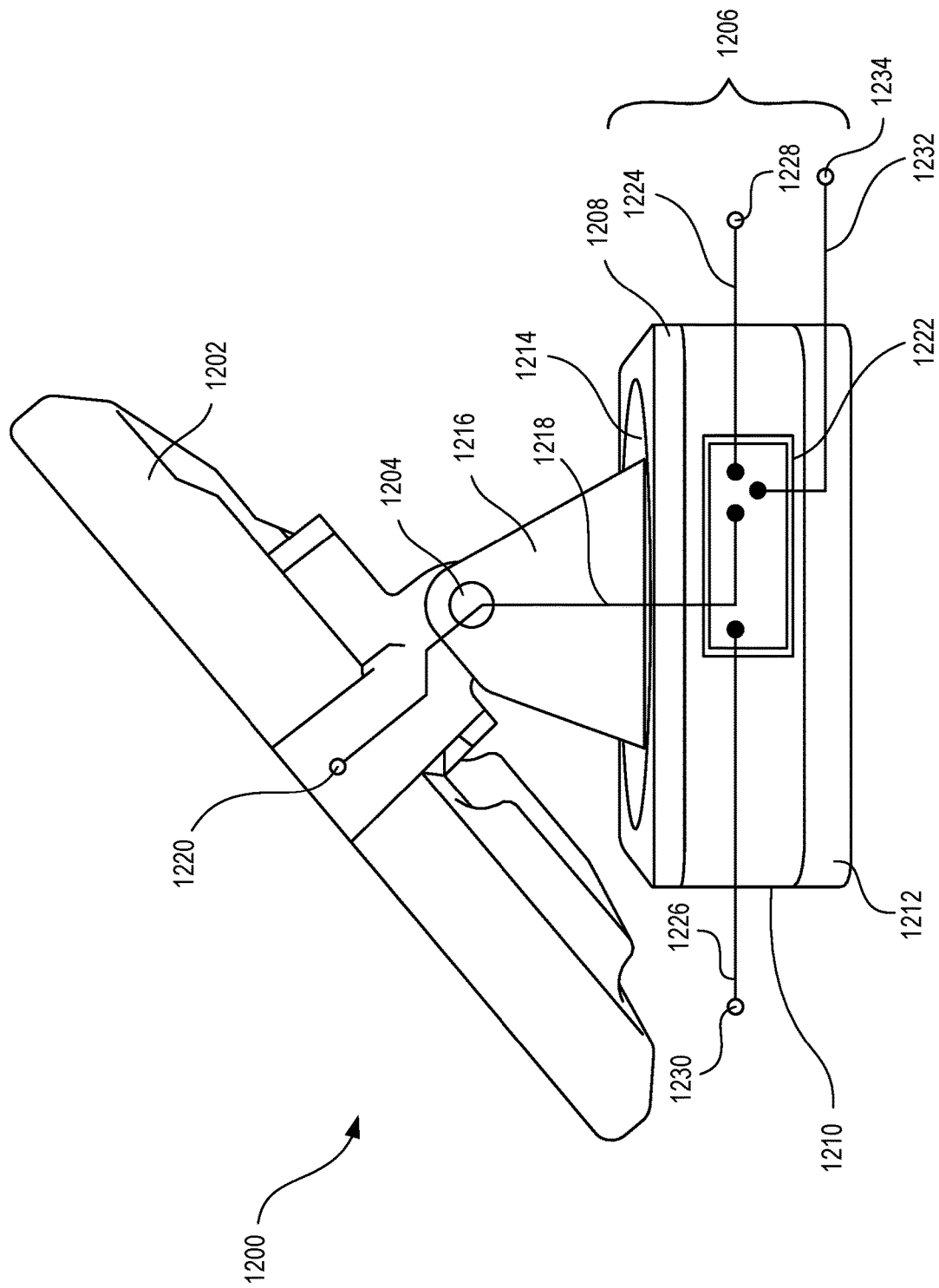

The display and docking apparatus 1200 may include a first wired path 1218 extending from a PED interface 1220 to an electronic junction 1222 in the connectivity module 1210. The connectivity module 1210 may include second and third wired paths 1224, 1226 that extend from the electronic junction 1222 and respective first and second external ports 1228, 1230. The display and docking apparatus 1200 may include a fourth wired path 1232 that extends from the electronic junction 1222 and through the docking stand foundation module 1212 to a third external port 1234 to enable data and/or power communication with a peripheral device. As shown in FIG. 12D, the display and docking apparatus 1200 may include several external ports, and corresponding wired paths, to enable data and power communication with the PED interface 1220.

Referring to FIGS. 13A-13H, an alternative embodiment of a display and docking apparatus 1300 is shown. As in previous embodiments, the display and docking apparatus 1300 includes a docking tray 1302, a hinge 1304 pivotally coupled to the docking tray 1302, and a base 1306 coupled to the hinge 1304. The base 1306 may include a docking stand foundation module 1308 that supports the display and docking apparatus 1300 on a horizontal surface. The base 1306 may further include a support member 1310 that extends from the docking stand foundation module 1308 on an angle and supports the hinge 1304 and the docking tray 1302.

The docking stand foundation module 1308 may include a turn table 1312 that is connected to the support member 1310. The turn table 1312 enables rotation of the support member 1310, hinge 1304, and the docking tray 1302 relative to the docking stand foundation module 1308.

The docking stand foundation module 1308 may include a planar support surface 1314 to support one or more additional modules. A connectivity module 1316 may rest on the planar support surface 1314. The turn table 1312 may extend partially under the connectivity module 1316. The connectivity module 1316 is secured to the docking stand foundation module 1308 rather than the turn table 1312.

The connectivity module 1316 may be embodied as the connectivity modules previously disclosed. The display and docking apparatus 1300 may include a first wired path 1318 extending from a PED interface 1320, through the base 1306 to an electronic junction 1322 in the connectivity module 1316. The connectivity module 1316 may include a second wired path 1324 that extends from the electronic junction 1322 to a first external port 1326.

The display and docking apparatus 1300 may include a third wired path 1328 that extends from a node 1330 in communication with the first wired path 1318 and a second external port 1332.

Figure 13D:
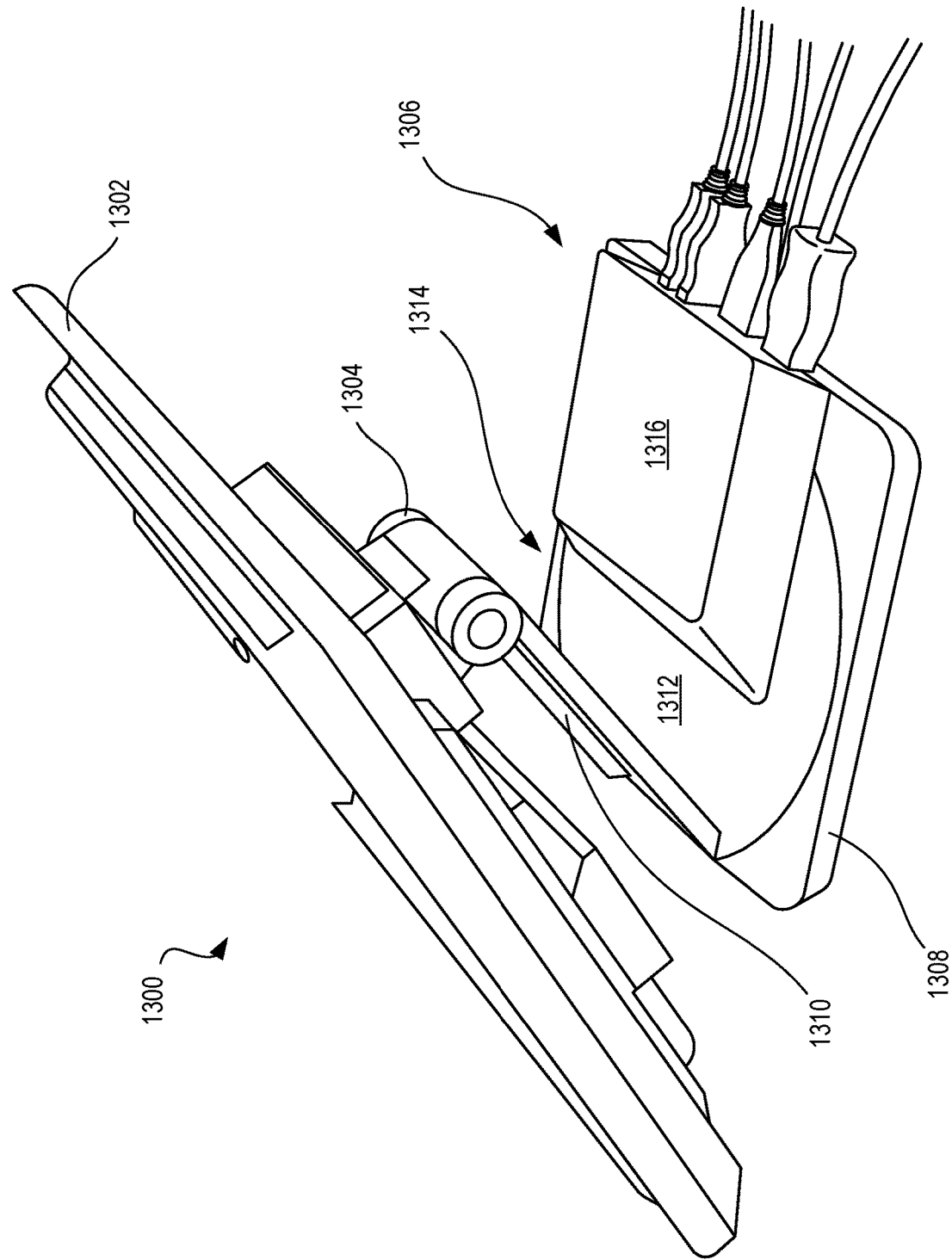
Figure 13E:
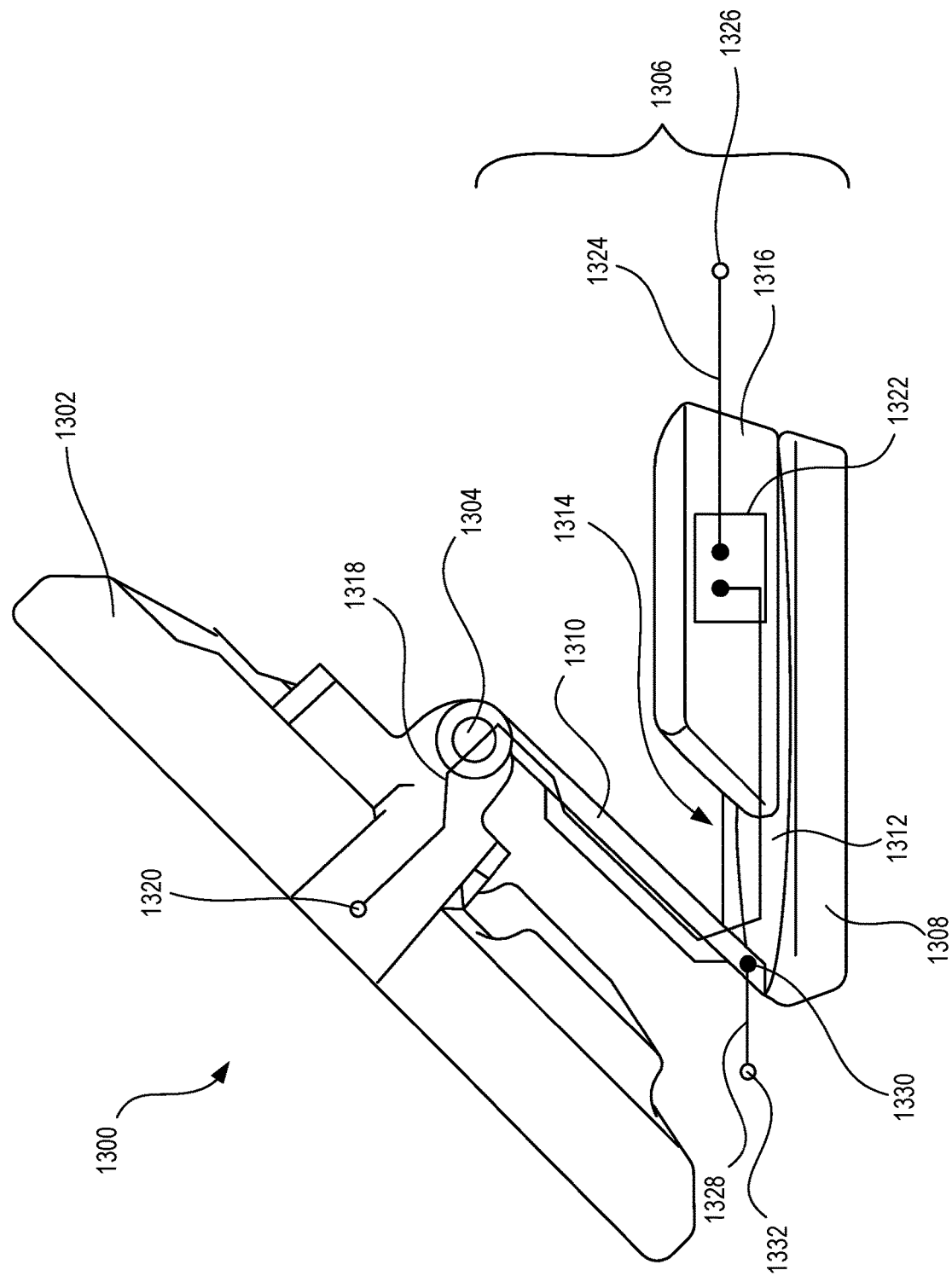

As shown in FIG. 13D, the display and docking apparatus 1300 may include several external ports, and corresponding wired paths, to enable data and power communication with the PED interface 1320.

Referring to FIG. 13F, rotation of the docking tray 1302, as enabled by the turn table 1312 is shown. As illustrated, the turn table 1312 may provide a 100 degree angle of rotation. The docking stand foundation module 1308 rests firmly on a horizontal surface while the docking tray 1302 rotates freely to provide a desired viewing angle.

Referring to FIG. 13G, rotation of the docking tray 1302, as enabled by the hinge 1304, is shown. A primary user may tilt the docking tray backwards to share the PED with a secondary user sitting on the other side of a horizontal surface.

Referring to FIG. 13H, the docking tray 1302 has been rotated, through use of the hinge 1304, to an opposing side of that shown in FIG. 13F. FIG. 13H illustrates that on the opposing side, the turn table 1312 also provides a viewing rotation for the docking tray 1302. In all of the rotations illustrated in FIGS. 13F-13H, cables interfacing with the display and docking apparatus 1300 are not disturbed as the connectivity module 1316 may remain stationary with the foundation module 1308. As such, the docking tray 1302 is able to rotate freely along the axes provided by the hinge 1304 and the turn table 1314.

Referring to FIGS. 14A-14C, illustrate an alternative embodiment of a display and docking apparatus 1400 that is sized and configured to accommodate a smartphone as the PED 1402. The display and docking apparatus 1400 includes a docking tray 1404 to receive the PED 1402 in a case 1406 or just the PED 1402 alone. The docking tray 1404 includes an interface 1406 to electrically communicate with the PED 1402. As illustrated, the PED 1402 may extend out of the docking tray 1404 when the PED 1402 is fully seated within the docking tray 1404.

The display and docking apparatus 1400 includes a hinge 1408 that is coupled to the docking tray 1404 and a base 1410. As illustrated in FIG. 14A, the hinge 1408 enables pivotal movement of the docking tray 1404 relative to the base 1410. The base 1410 may be embodied with one or more of any of the features or functions disclosed in bases of the previous embodiments. Thus, the base 1410 may have a rotatable module 1412 and a stationary module 1414.

As illustrated in FIGS. 14A and 14C, a cable 1416 couples to an external port 1418 of the base 1410.

Disclosed herein are various exemplary embodiments for a display and docking apparatus. As can be appreciated by one of skill in the art, any one or more of the features, functions, and structure provided in one embodiment can be utilized in another disclosed embodiment. Thus, many, if not all of the features, functions, and structure are interchangeable with the disclosed embodiments.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A display and docking apparatus to receive and support a portable electronic device, comprising: a docking tray to receive the portable electronic device; a base, configured to rest on a surface; a hinge coupled to the docking tray and the base to allow the docking tray to pivot relative to the base to enable rotation of the docking tray from a first position wherein a display side of the received portable electronic device is at an angle relative to the surface, to a second position, wherein the display side of the received portable electronic device is parallel to the surface, and to a third position, beyond the second position, wherein the display side of the received portable electronic device is at an angle relative to the surface; a first interface disposed in the docking tray and configured to removably couple with a port of the portable electronic device to enable power and data communication with the portable electronic device; and a cable coupled at a first end to the first interface and extending at least through part of the base, wherein the base includes a plurality of interconnected modules and including a foundation module to support the display and docking apparatus, a connectivity module removably connected to the foundation module and including a plurality of ports to enable power and data communication, and a docking tray support module removably connected to the connectivity module and connected to the hinge, and wherein the modules are interchangeable with one another.

2. The display and docking apparatus of claim 1, wherein the docking tray support module is pivotable relative to the foundation module.

3. The display and docking apparatus of claim 1, wherein the base further includes the connectivity module to communicate with the cable and one or more external ports to thereby enable data communication between the portable electronic device and an external device.

4. The display and docking apparatus of claim 1, wherein the base further includes a physical security module configured to engage with a security device.

5. The display and docking apparatus of claim 1, wherein the base further includes a power module to communicate with the cable and thereby enable power communication with the portable electronic device.

6. The display and docking apparatus of claim 5, wherein the power module includes a battery that is in electrical communication with the cable.

7. The display and docking apparatus of claim 1, wherein the base further includes an indicator module configured to provide a visual signal to a user.

8. The display and docking apparatus of claim 1, wherein the base further includes a sound module configured to provide an audio signal to a user.

9. The display and docking apparatus of claim 1, wherein the base further includes a payment module including a payment input reader to receive payment information.

10. The display and docking apparatus of claim 1, wherein the docking tray includes an open end and a closed end and the docking tray is configured to receive the portable electronic device by sliding the portable electronic device into the open end.

11. The display and docking apparatus of claim 10, wherein the docking tray further comprises a rail configured to engage and retain the portable electronic device.

12. The display and docking apparatus of claim 1, wherein the first interface is disposed in the docking tray in proximity to the closed end.

13. The display and docking apparatus of claim 1, further comprising a rectangular case to receive and at least partially encase the portable electronic device, wherein the case is configured to engage with the docking tray, the case including, four perimeter sides, and an aperture to access the portable electronic device.

14. The display and docking apparatus of claim 1, wherein the docking tray includes:
- a rectangular body;
- a closed end extending along at least a majority of a first perimeter side of the docking tray to limit movement of the case and portable electronic device and extending along a first perimeter side of the case,
- a first rail extending along at least a majority of a second perimeter side of the docking tray and extending along a second perimeter side of the case and configured to engage and retain the case and the portable electronic device,
- a second rail extending along at least a majority of a third perimeter side of the docking tray, and parallel to the first rail, and extending along a third perimeter side of the case and configured to engage and retain the case and the portable electronic device, and
- an open end extending along at least a majority of a fourth perimeter side of the docking tray and extending along a fourth perimeter side of the case, the open end to receive the case and the portable electronic device by sliding the case and the portable electronic device into the open end.

15. The display and docking apparatus of claim 14, wherein the first interface is disposed in the closed end of the docking tray and the first interface is configured to extend through the case aperture.

16. The display and docking apparatus of claim 1, wherein the hinge includes an extended hinge base.

17. The display and docking apparatus of claim 1, wherein the hinge enables 100 degree rotation of the docking tray.

18. A display and docking apparatus to receive and support a portable electronic device, comprising: a docking tray to receive the portable electronic device; a base, configured to rest on a surface, the base including a plurality of interconnected modules including a foundation module to support the display and docking apparatus, a connectivity module removably connected to the foundation module and including a plurality of ports to enable power and data communication, and a docking tray support module removably connected to the connectivity module; wherein the modules of the base are removable and interchangeable with one another; a hinge coupled to the docking tray and the base to allow the docking tray to pivot relative to the base to enable rotation of the docking tray from a first position wherein a display side of the received portable electronic device is at an angle relative to the surface, to a second position, wherein the display side of the received portable electronic device is parallel to the surface, and to a third position, beyond the second position, wherein the display side of the received portable electronic device is at an angle relative to the surface; and a first interface disposed in the docking tray and configured to removably couple with a port of the portable electronic device to enable power and data communication with the portable electronic device.

19. The display and docking apparatus of claim 18, wherein the docking tray support module is pivotable relative to the foundation module.

20. The display and docking apparatus of claim 18, wherein the base further includes the connectivity module including one or more external ports in electrical communication with the first interface.

21. The display and docking apparatus of claim 18, wherein the base further includes a physical security module configured to engage with a security device.

22. The display and docking apparatus of claim 18, wherein the base further includes a power module to communicate with the first interface and thereby enable power communication with the portable electronic device.

23. The display and docking apparatus of claim 22, wherein the power module includes a battery that is in electrical communication with the first interface.

24. The display and docking apparatus of claim 18, wherein the base further includes an indicator module configured to provide a visual signal to a user.

25. The display and docking apparatus of claim 18, wherein the base further includes a sound module configured to provide an audio signal to a user.

26. The display and docking apparatus of claim 18, wherein the base further includes a payment module including a payment input reader to receive payment information.

27. The display and docking apparatus of claim 18, wherein the docking tray includes an open end and a closed end and the docking tray is configured to receive the portable electronic device by sliding the portable electronic device into the open end.

28. The display and docking apparatus of claim 27, wherein the docking tray further comprises a rail configured to engage and retain the portable electronic device.

29. The display and docking apparatus of claim 18, wherein the first interface is disposed in the docking tray in proximity to the closed end.

30. The display and docking apparatus of claim 18, further comprising a rectangular case to receive and at least partially encase the portable electronic device, wherein the case is configured to engage with the docking tray, the case including,
- four perimeter sides, and
- an aperture to access the portable electronic device.

31. The display and docking apparatus of claim 18, wherein the hinge enables 100 degree rotation of the docking tray.

32. A display and docking apparatus on a surface to receive and support a portable electronic device, comprising: a docking tray including, an open end to receive the portable electronic device, and a closed end to limit movement of the portable electronic device; a hinge connected to the docking tray to enable pivotable movement of the docking tray to enable rotation of the docking tray from a first position wherein a display side of the received portable electronic device is at an angle relative to the surface, to a second position, wherein the display side of the received portable electronic device is parallel to the surface, and to a third position, beyond the second position, wherein the display side of the received portable electronic device is at an angle relative to the surface; a base, configured to rest on the surface and coupled to the hinge, the base including, a plurality of interconnected modules, wherein the modules include a foundation module to support the display and docking apparatus, a connectivity module removably connected to the foundation module and including a plurality of ports to enable power and data communication, and a docking tray support module configured to enable pivotal movement of the hinge and the docking tray relative to the foundation module; wherein the docking tray support module is removably connected to the connectivity module; wherein the modules of the base are removable and interchangeable with one another; and a first interface disposed in the docking tray and configured to removably couple with a port of the portable electronic device to enable power and data communication with the portable electronic device.

33. The display and docking apparatus of claim 32, wherein the hinge enables 100 degree rotation of the docking tray.

\* \* \* \* \*